J. R. MOFFATT AND R. S. KELSO.
SEWING MACHINE.
APPLICATION FILED DEC. 11, 1916.

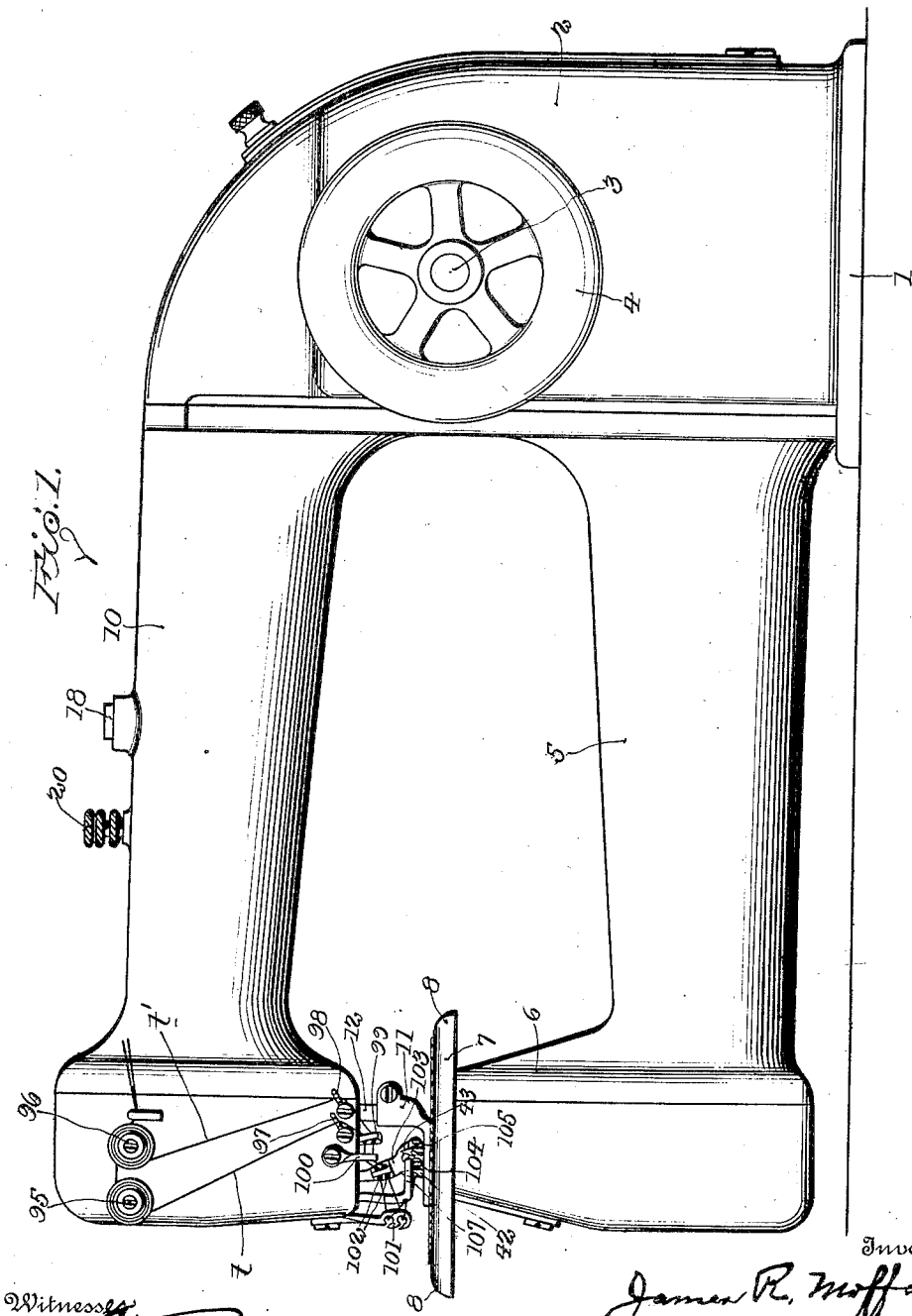

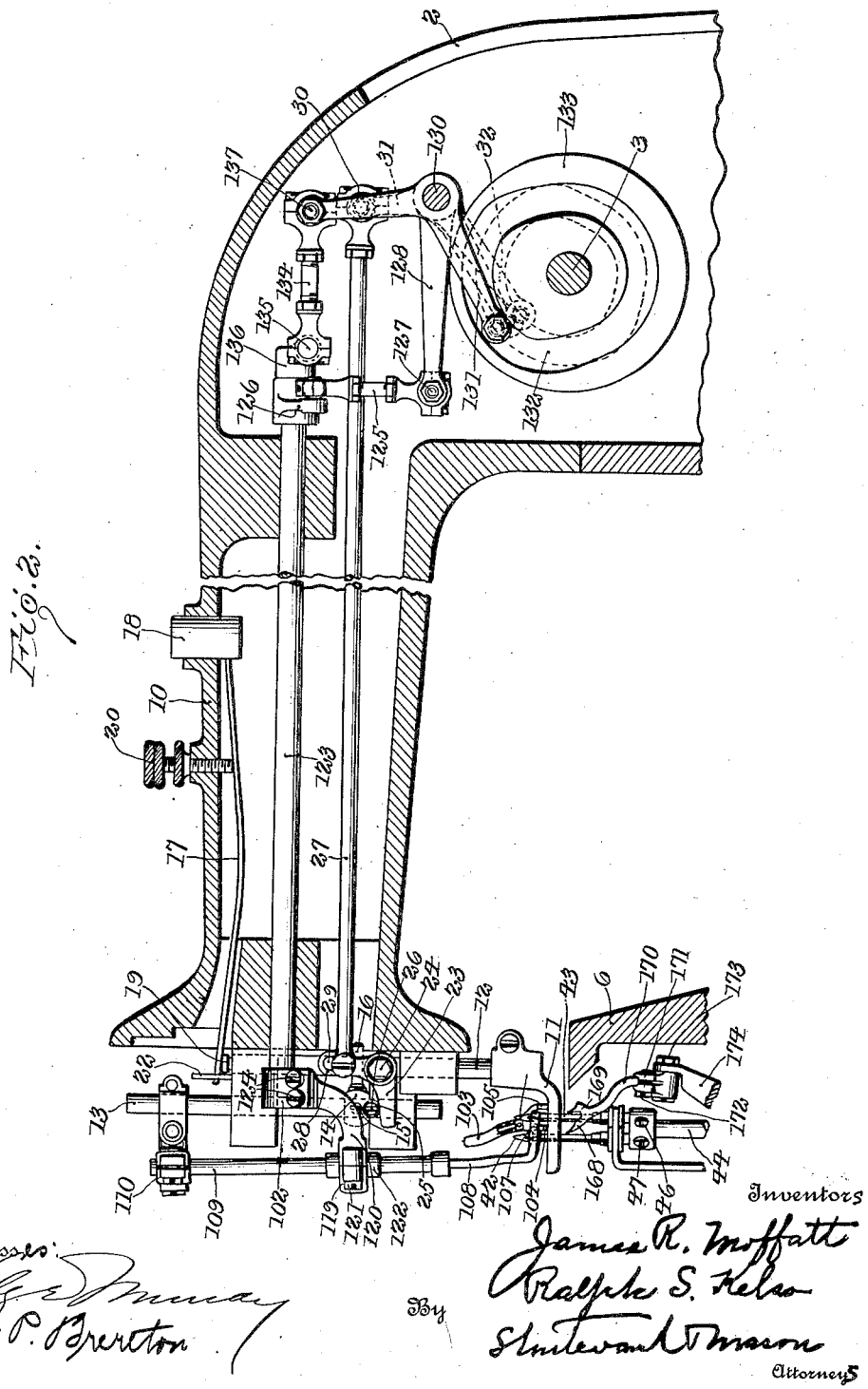

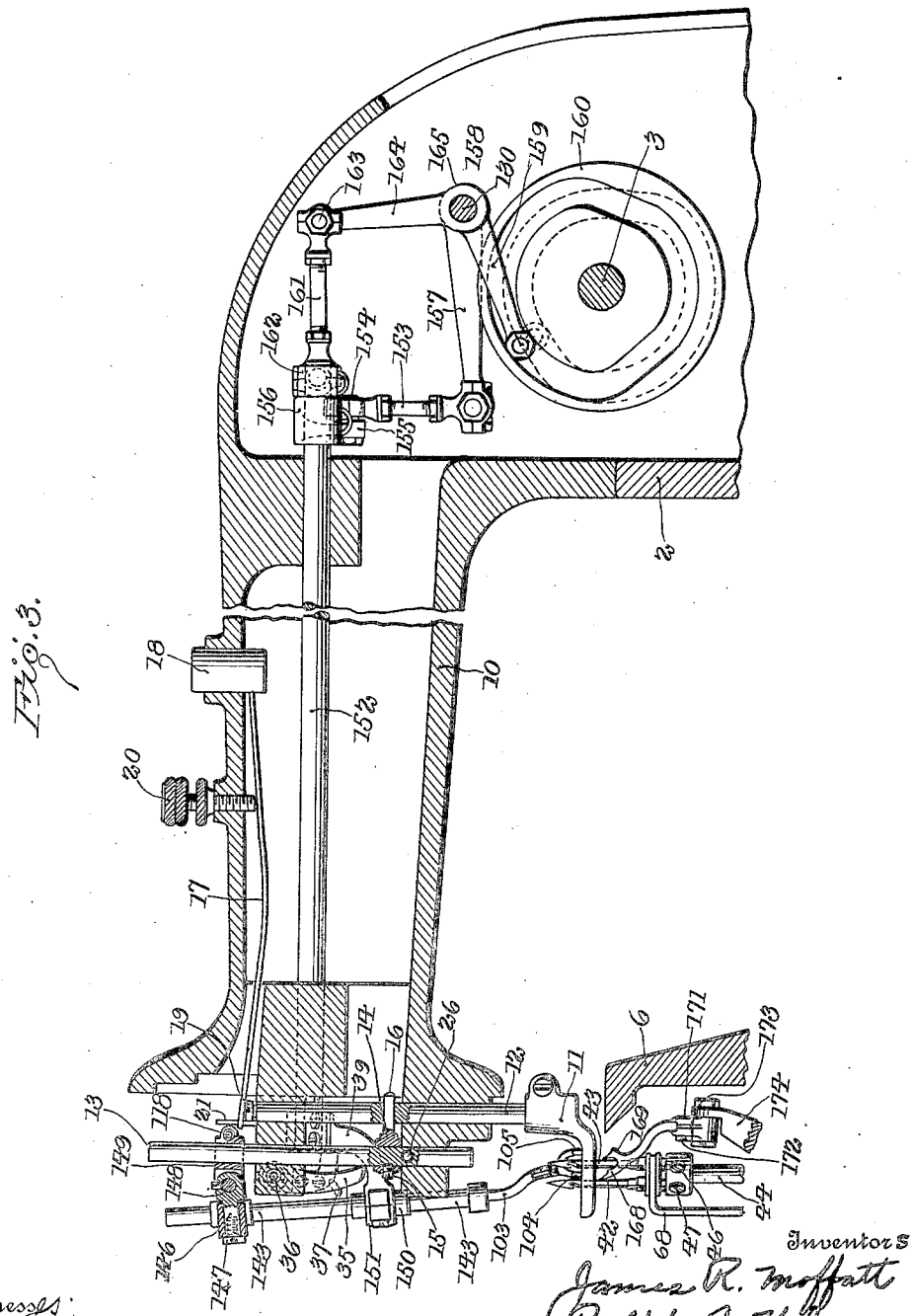

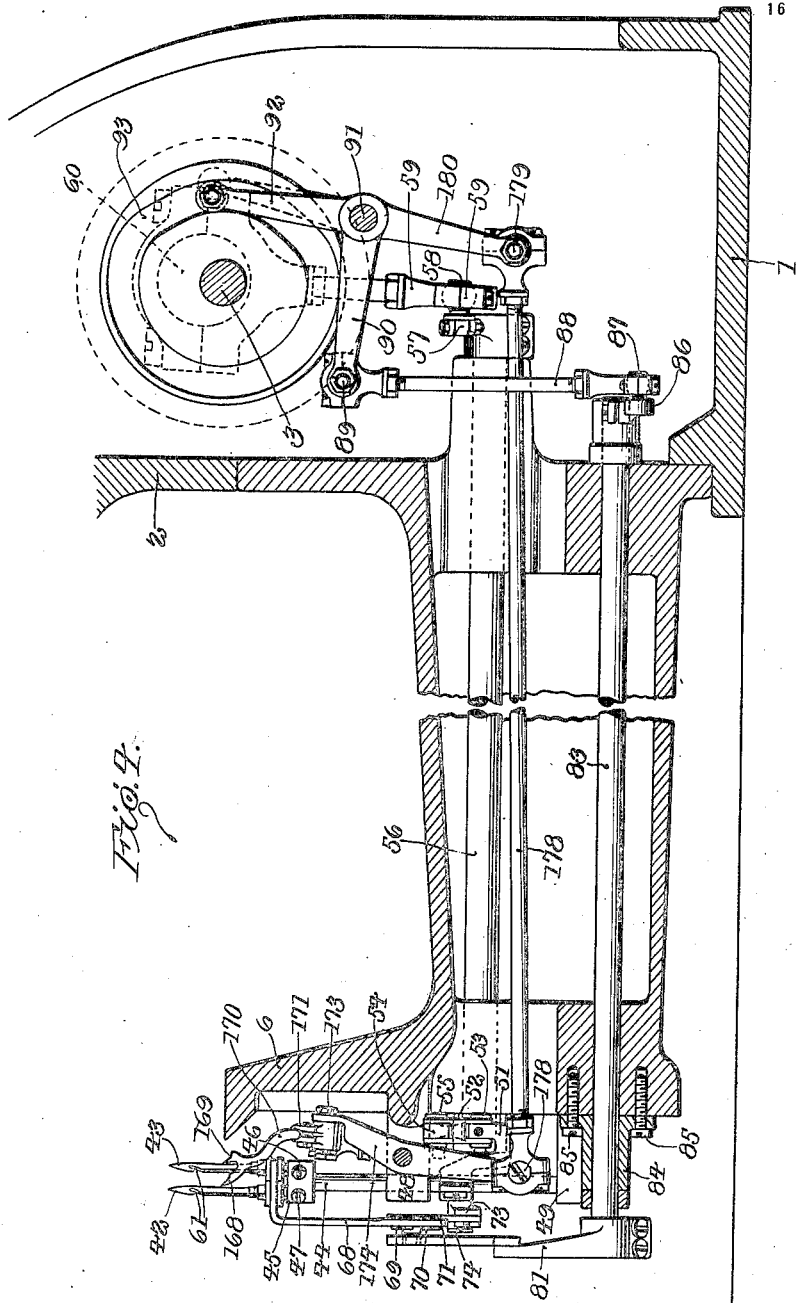

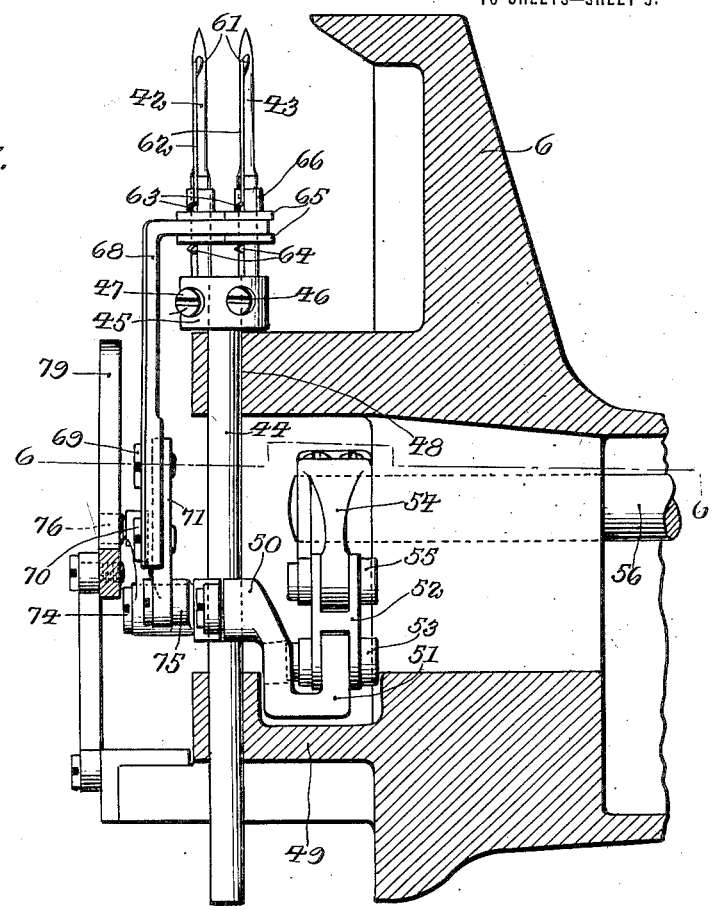

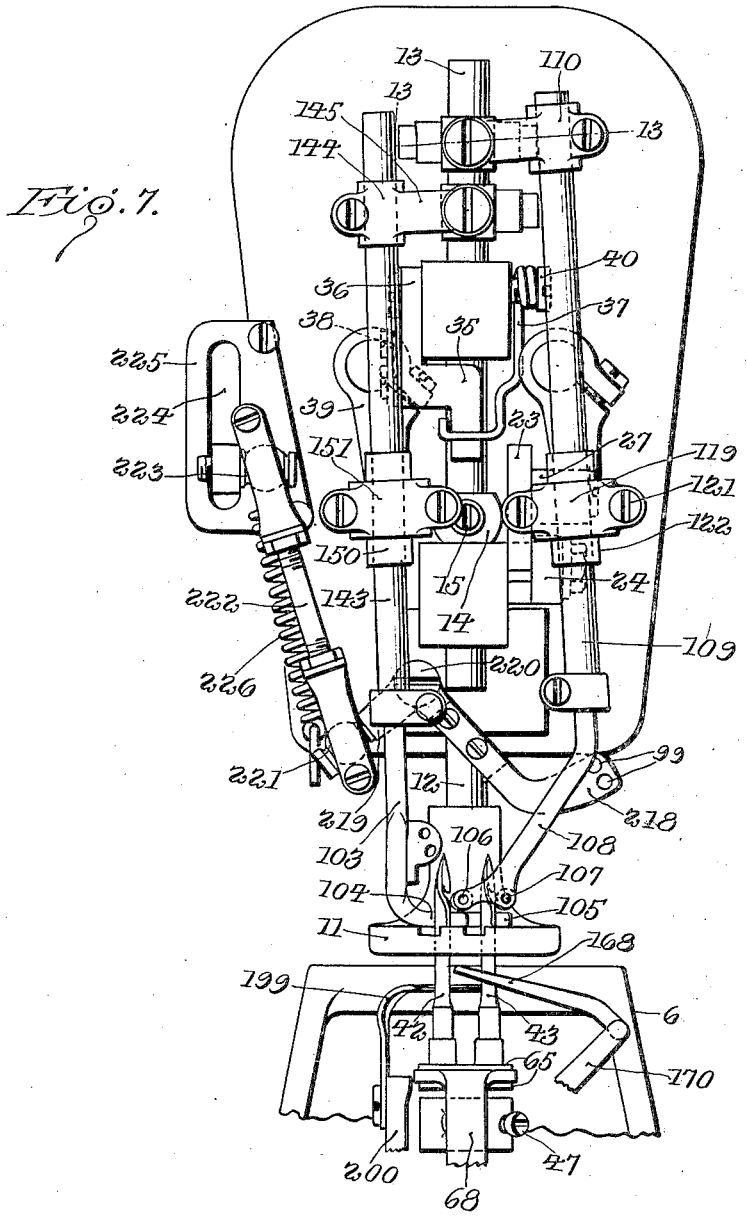

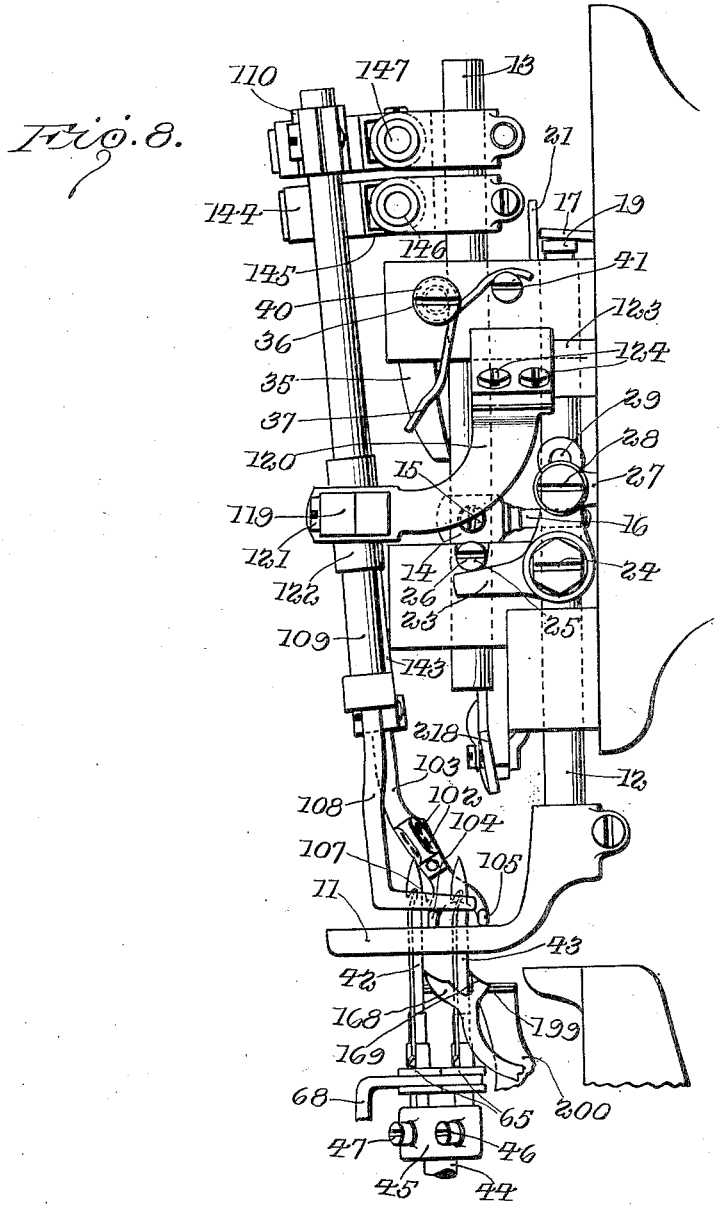

1,332,511.

Patented Mar. 2, 1920.
16 SHEETS—SHEET 8.

J. R. MOFFATT AND R. S. KELSO.
SEWING MACHINE.
APPLICATION FILED DEC. 11, 1916.

1,332,511.

Patented Mar. 2, 1920.
16 SHEETS—SHEET 9.

J. R. MOFFATT AND R. S. KELSO.
SEWING MACHINE.
APPLICATION FILED DEC. 11, 1916.
1,332,511.
Patented Mar. 2, 1920.
16 SHEETS—SHEET 10.
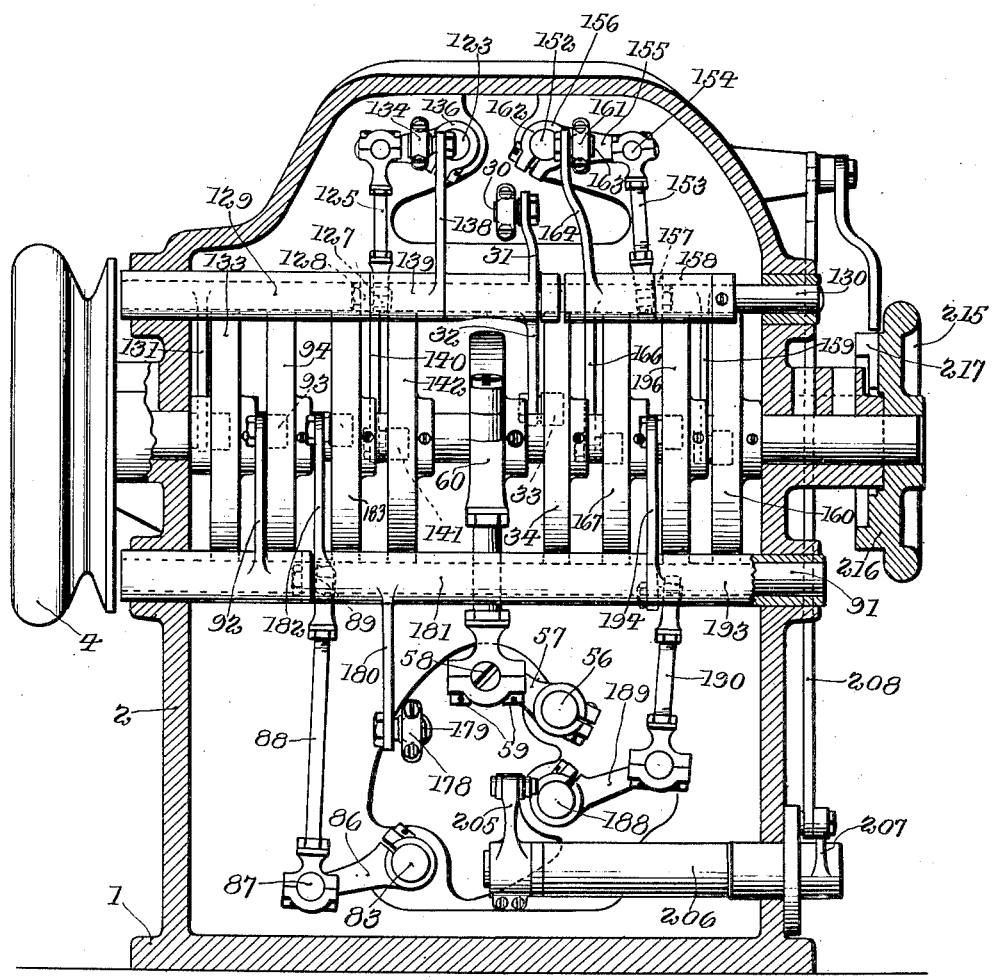

J. R. MOFFATT AND R. S. KELSO.
SEWING MACHINE.
APPLICATION FILED DEC. 11, 1916.
1,332,511.
Patented Mar. 2, 1920.
16 SHEETS—SHEET 11.
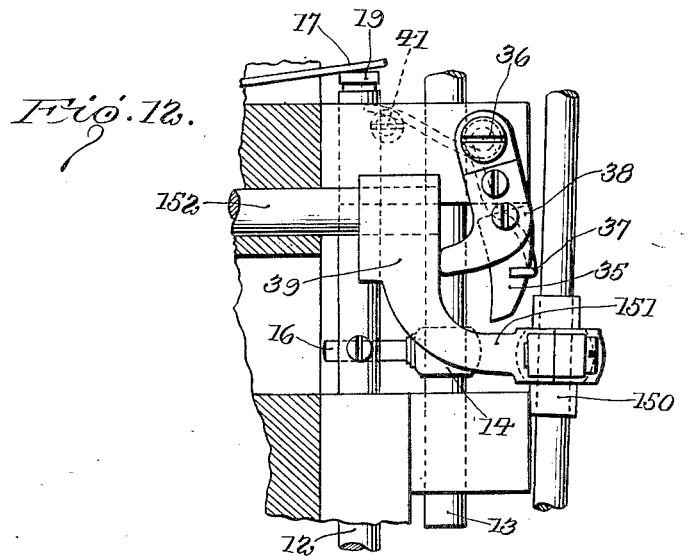
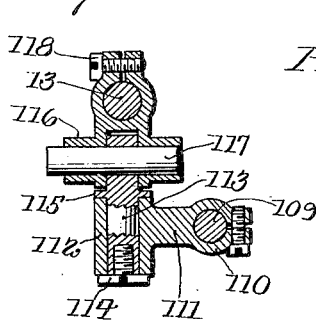
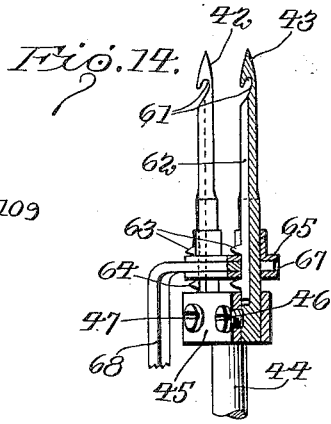
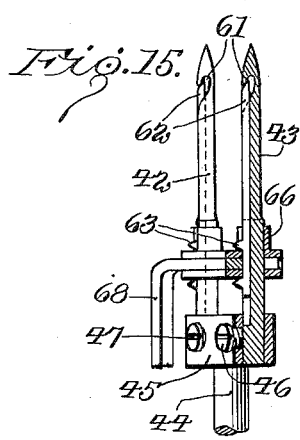
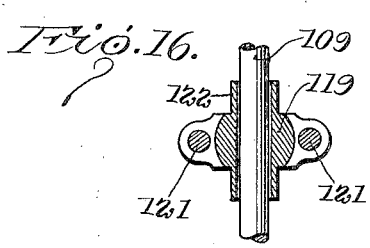

J. R. MOFFATT AND R. S. KELSO.
SEWING MACHINE.
APPLICATION FILED DEC. 11, 1916.

1,332,511.

Patented Mar. 2, 1920.
16 SHEETS—SHEET 12.

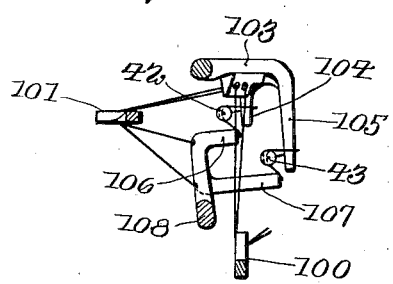
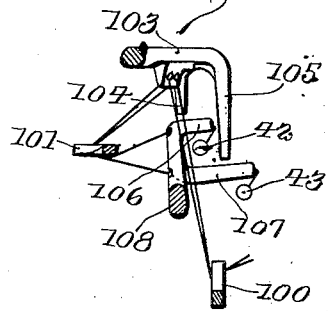
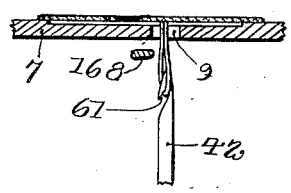
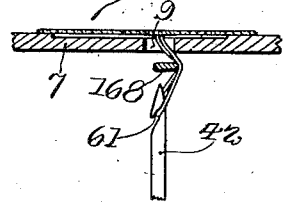
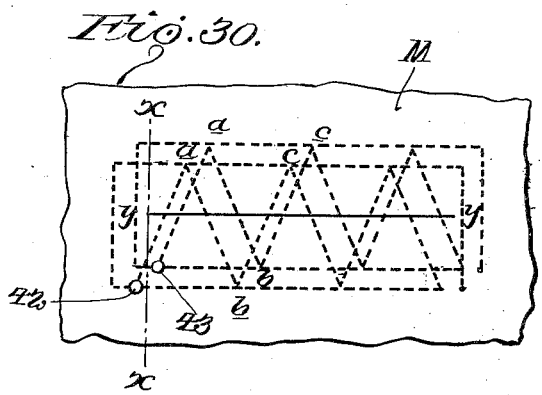

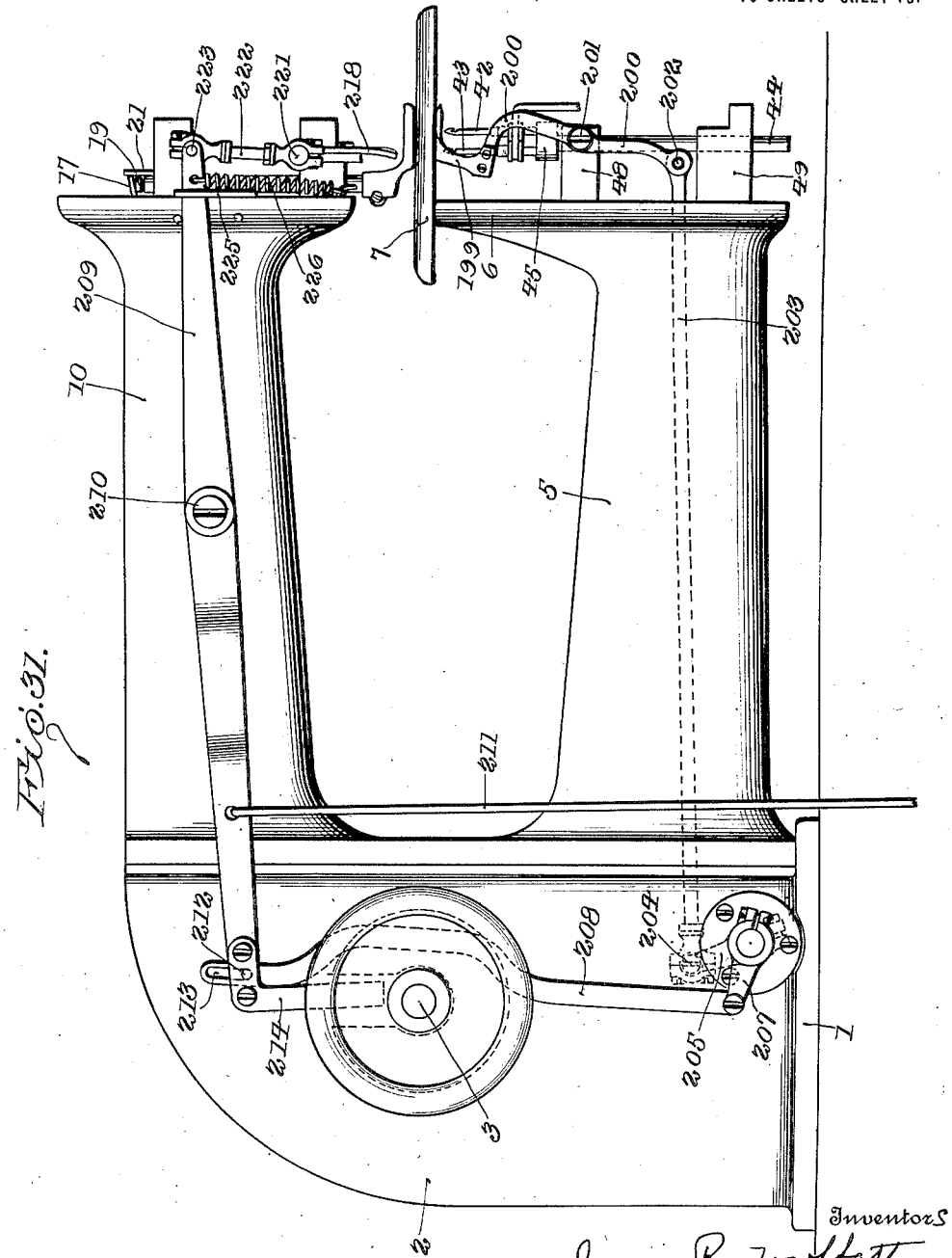

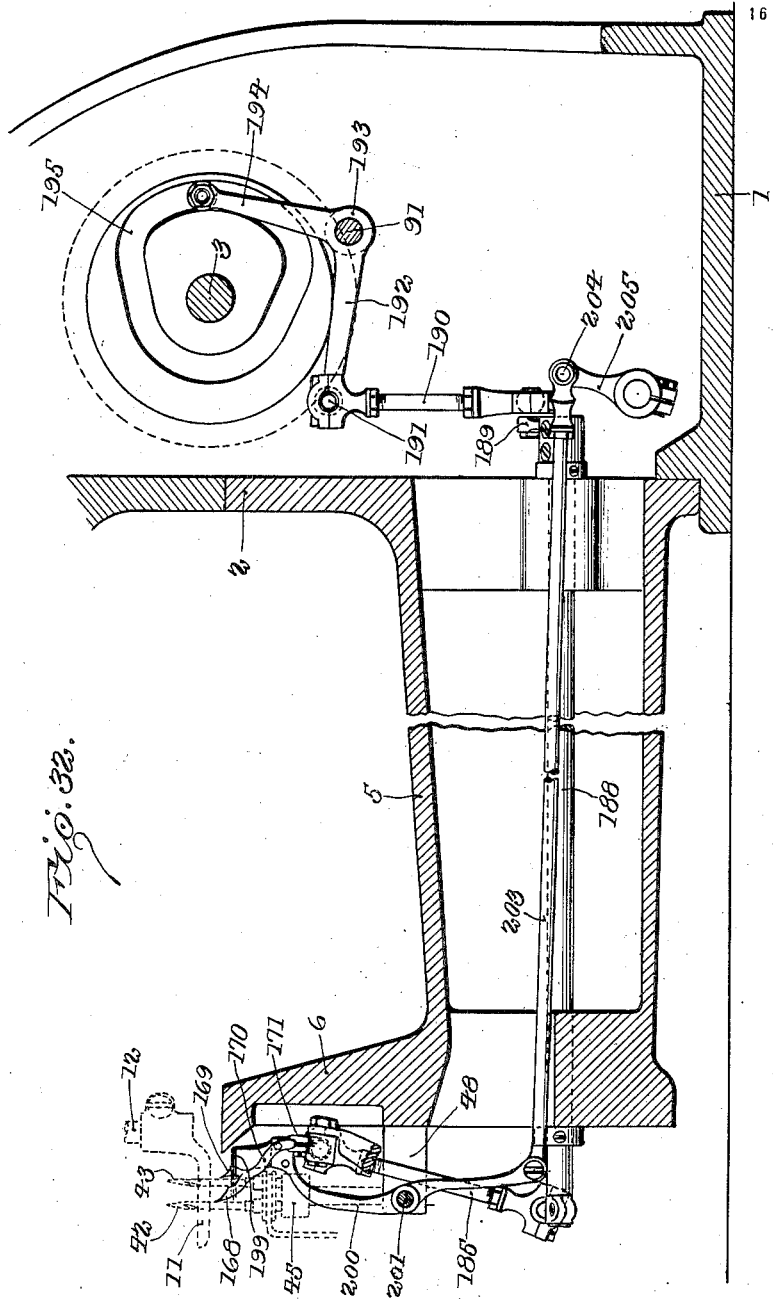

UNITED STATES PATENT OFFICE.

JAMES R. MOFFATT AND RALPH S. KELSO, OF CHICAGO, ILLINOIS, ASSIGNORS TO UNION SPECIAL MACHINE COMPANY, OF CHICAGO, ILLINOIS, A CORPORATION OF ILLINOIS.

SEWING-MACHINE.

1,332,511.   Specification of Letters Patent.   Patented Mar. 2, 1920.

Application filed December 11, 1916. Serial No. 136,273.

*To all whom it may concern:*

Be it known that we, JAMES R. MOFFATT and RALPH S. KELSO, citizens of the United States, both residing at Chicago, in the county of Cook, State of Illinois, have invented certain new and useful Improvements in Sewing-Machines, of which the following is a description, reference being had to the accompanying drawing and to the figures of reference marked thereon.

The invention relates to new and useful improvements in sewing machines, and more particularly to a chain stitch sewing machine which may be used for darning fabrics or for like purposes.

An object of the invention is to provide a sewing machine of the above character with means for placing the loop of thread to be entered by the needle in the concatenating of the stitching thread in a predetermined position relative to the needle so that the fabric may be fed in any direction without disturbing the formation of the stitches.

Another object of the invention is to provide a machine of the above character wherein the needle is held against oscillation about its axis during the entire operation of the machine.

A further object of the invention is to provide a machine of the above character wherein a hook needle is used and means provided for threading the needle, which threading means includes a device for engaging the thread between the needle and the material for placing the thread in a predetermined position relative to the needle, regardless of the direction of feed of the material relative to the needle so as to insure the laying of the thread into the hook of the needle.

A still further object of the invention is to provide a thread laying device for a hook needle of the above character wherein the device engaging the thread between the needle and the material is so positioned relative to the path of movement of a thread carrying device that the thread is laid against the needle in a plane substantially at right angles to the longitudinal axis of the needle.

A still further object of the invention is to provide a machine of the above character having a presser foot with means for automatically raising the presser foot at each reciprocation of the needle when the needle is withdrawn from the material so as to permit the material to be fed by hand.

A still further object of the invention is to provide automatic means for positively holding the presser foot from being raised by the needles when they are entering the material.

A still further object of the invention is to provide a machine of the above character with means for raising the thread laying devices with the presser foot so that said devices may be positioned very close to the upper face of the presser foot.

A still further object of the invention is to provide a darning machine of the above character having a plurality of vertically reciprocating hook needles and threading devices coöperating therewith, which needles are located in a vertical plane cutting the longitudinal axis of the work supporting arm of the machine at an acute angle so that, when the material is fed by hand back and forth in a direction parallel with the axis of the work supporting arm or at right angles thereto, the thread loops laid by the needles will be disposed in parallel lines.

These and other objects will in part be obvious and will in part be hereinafter more fully disclosed.

In the drawings, which show by way of illustration one embodiment of the invention:—

Figure 1 is a front view of a machine embodying the improvements;

Fig. 2 is a detail in section longitudinally through the arm of the machine, showing the needles, the means for positioning the needle loops, the thread carriers, and the means for operating the same;

Fig. 3 is a detail in section longitudinally through the arm showing the thread holder for engaging a thread between the hook needles and the material for assisting and threading the hook needles together with the means for operating the same;

Fig. 4 is a detail in section longitudinally through the work supporting arm showing the needles, the means for operating the needles, the positioning device for the needle loops, and the devices for operating the same;

Fig. 5 is an enlarged detail view showing the end of the work supporting arm, the needles, the means for operating the needles, and the means for operating the latches which close the hook of the needles;

Fig. 6 is a sectional view on the line 6—6 of Fig. 5;

Fig. 7 is an enlarged detail front elevation showing the needles, the work support, the presser foot, and the devices mounted on the forward end of the overhanging arm and coöperating to thread the needles, also the pull-off for pulling off thread prior to the cutting of the threads beneath the work support;

Fig. 8 is an enlarged detail view in side elevation showing the needles, the presser foot, the devices for threading the needles, the pull-off for the threads prior to the cutting of the threads, the loop positioner, and the thread cutter and their relative positions when the needles are raised;

Fig. 11 is a sectional view through the standard, showing the operating cams and the parts directly operated thereby for operating the various devices in the machine;

Fig. 12 is a detail showing the means for preventing the raising of the presser foot except when the needle points are below the work support;

Fig. 13 is a sectional view on the line 13—13 of Fig. 7;

Fig. 14 is a detail showing, partly in side elevation and partly in section, the needles, the needle clamp, and the device for operating the latches for the needles, the hooks of the needles being open;

Fig. 15 is a similar view, but showing the hooks of the needles closed;

Fig. 16 is a sectional view showing one of the ball sleeves for operating the thread-carrying and thread-positioning devices;

Figure 17:
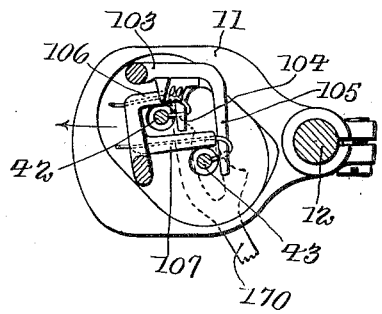
Figure 18:
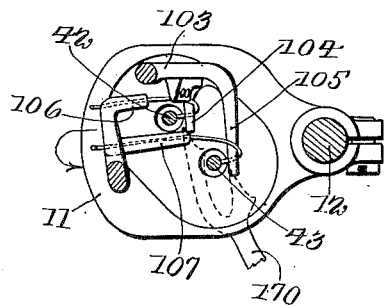
Figure 19:
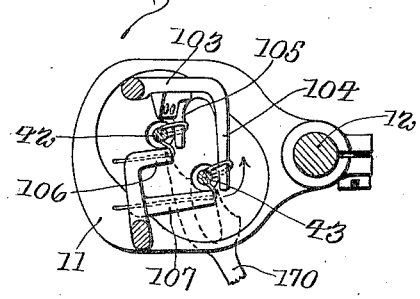
Figure 20:
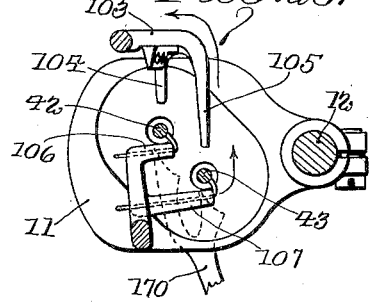
Figure 21:
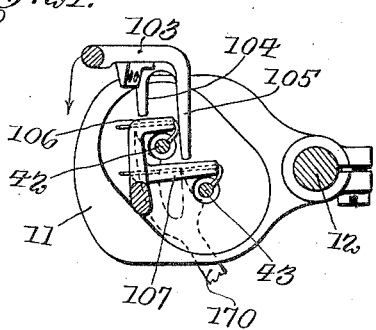
Figure 22:
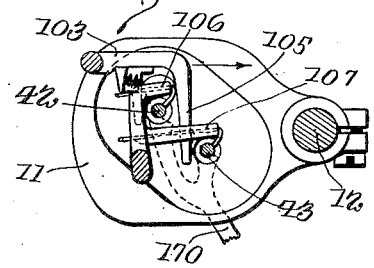
Figure 23:
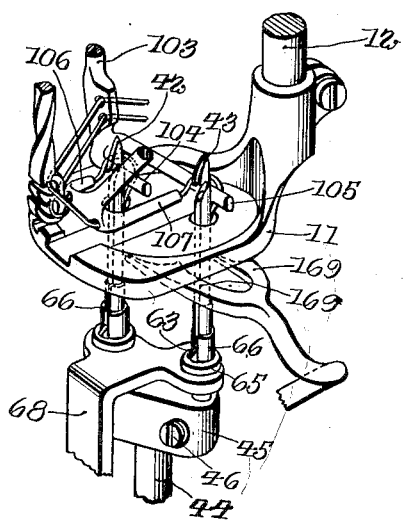
Figure 24:
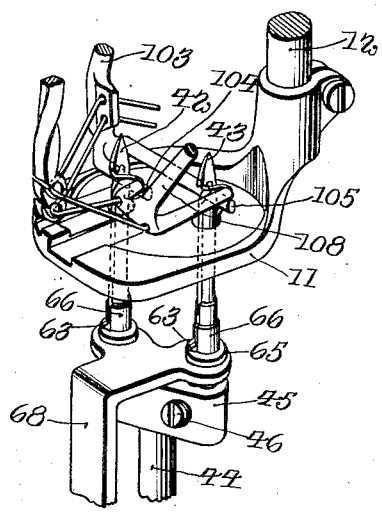

Fig. 17 is a view, partly in section and partly in plan, showing the needles, the presser foot, the thread-carrying devices, and the thread-holding fingers which coöperate therewith in threading the hooks of the needles, the thread-holding fingers having just engaged the threads preparatory to the thread-carrying devices laying the threads about the needles, and also showing in dotted lines the loop-positioner beneath the work support;

Fig. 18 is a similar view, but showing the thread-carrier as having moved partly back away from the thread-holding fingers;

Fig. 19 is a similar view, but showing the thread-carrying devices as having moved part way around the needles and the thread as laid in the hooks of the needles;

Fig. 20 is a similar view, but showing the thread-carrying devices as having finished their threading operation and the thread fingers withdrawn so as to permit the needle thread loop to be drawn down into the material;

Fig. 21 is a similar view, but showing the thread-laying devices as having again moved across the path of the needles to position for the threading of the hooks of the needles, and to permit the needles to rise through the material;

Fig. 22 is a similar view, but showing the thread-holding fingers as having moved forward and ready to move into engagement with the needle threads;

Fig. 23 is a perspective view showing the needles, the thread-carrying devices, the thread-holding fingers above the presser foot, the thread guide, and the loop-positioner which engages the looper beneath the work support, the thread-holding fingers being positioned as shown in Fig. 18;

Fig. 24 is a view similar to Fig. 23, but showing the thread-laying devices as having laid the threads in the hooks of the needles;

Fig. 25 is a view, partly in plan and partly in section, showing the relative positions of the stationary thread guides and the movable thread guide carried by the thread-holding fingers when the needles are at the upper ends of their strokes;

Fig. 26 is a similar view, but showing the position of the thread guides when the needle hooks are passing through the material;

Fig. 27 is a detail showing the position of the needle, the work support, and the loop-positioning finger as the point of the needle passes beneath the work support;

Fig. 28 is a similar view, but showing the loop-positioning device as having engaged the needle loop and placed the same in proper position for the needle to pass up through the same;

Fig. 29 is a detail view showing one of the needles and the thread loop-positioning device coöperating therewith for positioning the looper thread to be entered by the needle, also by an arrow the direction of feed by the hand feed of the material;

Fig. 30 is a view showing, more or less diagrammatically, the position of the needles relative to the longitudinal axis of the work support which is indicated by the line $x$—$x$, and also indicating the manner in which the material may be fed for closing and darning a cut or tear in a bag or the like;

Fig. 31 is a rear view of the machine with parts removed, showing more particularly the thread-cutting device, the pull-off coöperating therewith, and the controlling means for these parts;

Fig. 32 is an enlarged sectional view longitudinally through the work support and a portion of the standard showing the operating mechanism for the cutter, and also the operating mechanism for the loop-positioning device below the work support;

Fig. 33 is a detail showing the operation of the thread pull-off when the cutter is moved forward to cut the thread loops;

Fig. 34 shows the thread cutter having cut one of the thread loops and the end of the thread which is left thereby for the beginning of the next stitching operation.

The invention is directed to a sewing machine which may be either of the single thread chain stitch type, or the double thread chain stitch type, and which is used for the purpose of forming enchained thread loops for closing a cut or tear in a bag or the like. The machine is provided with a standard having an overhanging arm, and a work supporting arm which carries a vertical post at its forward end on which is mounted the work support proper. The material is held on the work support by a presser foot. This presser foot is automatically raised at each reciprocation of the needle bar, and this mechanism is so timed as to raise the presser foot when the needle is withdrawn from the material so that the material may be fed by hand and may be fed in any direction relative to the needle.

The stitching mechanism, when of the single thread chain stitch type, includes preferably a hook needle which is mounted beneath the work support. When the needle moves up through the material, a thread-carrying device and a coöperating thread-holding finger lays a thread in the hook of the needle. This thread-holding finger moves across the path of the needle when said needle is beneath the material and engages the thread between the supply and the material and serves as a means for placing the thread in a predetermined position relative to the needle regardless of the direction of feed of the material. After the hook of the needle is raised above the material, then the thread-carrying device lays the thread against the shank of the needle and into the hook, said thread-holding finger coöperating in the placing of the thread in the hook. Coöperating with the needle beneath the work support is a thread loop-placing device which moves across the path of the needle when the needle is substantially retracted and engages the shank of the needle loop on the needle and places this needle thread loop in a predetermined position relative to the needle, regardless of the direction of feed of the material. In other words, this loop-placing device performs the function usually performed by the feed in placing the thread loop for the entrance of the needle in the concatenating of the loops so that the material may be fed by hand in any direction without disturbing the stitch formation. The thread-holding finger above the work support has four motions so that it may move across the path of the needle to engage the needle thread, and then move in a direction to release the needle thread so as to permit the needle to pull thread down on the material. This thread-holding finger also has a thread guide moving therewith which serves to pull thread from the supply as the needle begins its downward movement, and also serves to give up thread to the needle as the hook of the needle passes beneath the material.

The machine is also preferably provided with means for preventing the lifting of the presser foot when the needles are penetrating the material so that the presser foot becomes a rigid member at this time. The machine is also preferably provided with a thread-cutter which cuts the thread beneath the work support as it is held by the needle, and the mechanism which operates the cutter first operates a pull-off finger to pull thread through the tensions so that the length of thread left at the finishing of one stitching operation is sufficient to extend well under the presser foot, and thus hold the same for the threading of the needle when the next stitching operation begins.

Referring more in detail to the drawings:—

The invention consists of a sewing machine having a supporting bed 1 carrying a standard 2 in which is mounted a cross shaft 3 operated by a suitable belt wheel 4. Extending from said standard is a work supporting arm 5 which carries a post 6 at its forward end on which is mounted the work support 7. This work support 7 is preferably circular in outline and has its edges 8 curved downwardly so as to permit the free manipulation by hand of the material which is being stitched by the machine. Said work support 7 is also provided with needle openings 9—9. Also projecting from the standard 2 is an overhanging arm 10. The material is held on the work support 7 by a presser foot 11 which is carried by a presser bar 12 mounted in the overhanging arm 10. The presser bar 12 slides in suitable bearings formed therefor in the overhanging arm (see Figs. 2 and 3). Connected to the presser bar 12 is a guide bar 13 which also slides vertically in suitable bearings in the overhanging arm. Said guide bar 13 carries a collar 14 which is secured thereto by a set-screw 15, and a pin 13ᶜ

16 projecting from this collar extends through a suitable opening in the presser bar. The presser bar is forced downwardly so as to hold the presser foot on the work support by a leaf spring 17 which is fulcrumed in a bracket 18 at the rear end of the spring, and the forward end of the spring rests on an adjustable screw 19 threaded into the upper end of the presser bar 12. Said leaf spring is placed under tension by an adjusting screw 20. Guiding pins 21 and 22 guide the forward end of the leaf spring and hold the same in engagement with the upper end of the presser bar.

The machine is especially adapted for darning cuts or tears in bags or the like, and to this end it is desirable to feed the material by hand. In order to facilitate the feeding of the material after the completion of each stitch, the presser bar is automatically raised during the formation of each stitch, and while the needle is beneath the material. The presser bar in the present embodiment of the invention is raised by a rock arm 23 which is pivoted at 24 to the overhanging arm, and one end of this rock arm extends underneath a roller 25 mounted on a stud 26 which is attached to the guide bar 13 (see Figs. 2 and 3). The other end of the rock arm 23 is attached to a link 27 by means of a pivot stud 28 which is adjustably mounted in a slot 29 in the rock arm 23. The opposite end of the link 27 is pivoted at 30 to a lever 31 (see Figs. 2 and 11). The lever 31 has a downwardly projecting arm 32 which carries a roller stud 33 running in a cam groove in a disk 34 on the cross shaft 3. This cam groove, which is indicated in dotted lines in Fig. 2, is so shaped and so timed on the cross shaft as to raise the presser foot when the needles are down, as has been stated above. The extent to which the presser foot is raised may be varied by adjusting the pivot stud 28 in the slot 29 in the rock lever 23. When this stud is moved away from the fulcrum of the rock lever, then the throw of the rock lever will be less and the presser foot will be raised to a less extent, while, on the other hand, when it is moved toward the fulcrum of the rock lever, then the throw of the rock lever will be relatively greater and the presser foot will be raised to a greater extent.

In the present embodiment of the invention, as will be described more in detail hereinafter, the needles are located beneath the work support and move up through the material. While the presser foot is spring-pressed downward against the work support, we have also provided means for preventing the raising of the presser foot by the needles when they penetrate the material. It sometimes occurs that there are hard spots or cross seams in the material being stitched, particularly when there are cuts or tears in burlap bags, and unless some means is provided for preventing the presser foot from yielding, the needles might not penetrate these hard spots.

The means for preventing the presser foot from being raised by the needles consists of a locking dog 35 which is pivoted at 36 to the overhanging arm, and this locking dog is normally pressed by a spring 37 to the right, as viewed in Fig. 3. The locking dog is thereby held either against the guide bar 13 or close to the face thereof so that it is in the path of the collar 15 secured to this guide bar 13. When the parts are in the position shown in Fig. 3, then the guide bar can not be raised to any great extent before the collar will strike this locking dog which will prevent further upward movement of the presser foot. Mounted on the locking dog 35 is an arm 38 (see Fig. 12). This arm projects laterally from the locking dog and is adapted to bear against an arm 39 which moves the thread-holding fingers. This arm 39 is timed in its normal movements so as to force the locking dog 35 to the left, as viewed in Fig. 3, or to the right, as viewed in Fig. 12, and thus withdraw the dog from the path of the collar 15 on the guide bar 13. This locking dog is withdrawn from the path of movement of the collar on the guide bar when the needles are beneath the material so that the presser bar may be raised by the automatic means above described. The spring 36 is secured by a screw 40 to the overhanging arm, and one end of said spring bears against a second screw 41, while the other end, which is under tension, bears against the locking dog and forces the same toward the guide bar 14, as above described.

The stitch forming mechanism, as shown in the drawings, consists of two hook needles and coöperating devices which lay a thread into each of said hook needles. The hook needles are indicated at 42 and 43 in the drawings. These needles are carried by a needle bar 44. Said needle bar has a needle clamping head 45, and the needles are clamped therein by the set-screws 46 and 47, respectively. The needle bar is mounted so as to reciprocate in projecting lugs 48 and 49 which are formed as a part of the work supporting arm 5.

Mounted on the needle bar is a collar 50. This collar has a laterally projecting arm 51 which extends upwardly away from the needle bar, thence downwardly, thence outwardly, and finally upwardly. To the upwardly extending part of the arm a link 52 is pivoted by a pivot bolt 53. This link 52 at its upper end is pivoted to an arm 54 by a pivot bolt 55. The arm 54 is carried by a shaft 56 which extends through the work supporting arm 5 and is journaled in suitable bearings carried thereby. The shaft 56 at its inner end is provided with a second arm 57 (see Figs. 4, 5 and 11). The arm 57 carries a ball stud 58. This ball stud 58 coöperates with an eccentric strap 59 which in turn coöperates with an eccentric 60 on the cross shaft 3. As this cross shaft 3 rotates, the eccentric will oscillate the shaft 56, and this in turn will reciprocate the needle bar.

Each of the needles 42 and 43 is provided with an open eye 61, thus forming a hook needle. Each needle has a latch 62. These latches are similar in construction and are operated by the same mechanism. The latch slides in a groove in the side of the needle. Each latch is provided with spaced lugs 63 and 64. On each needle is a collar 65. The collar is free to slide on the shank of the needle on which it is mounted. Each collar has a projecting portion 66 which is slotted to receive the lug 63. The collar proper is located between the lugs 63 and 64 and any endwise movement of the collar will be imparted through these lugs to the latches. Each collar has a groove 67 formed therein and an arm 68 has two recesses formed therein, one for each collar, so that any endwise movement of the arm 68 will be imparted to these collars on the shanks of the needles (see Figs. 14 and 15). The arm 68 is adjustably secured by screws 69 and 70 to the upper end of a link 71. The arm is formed with slots 72 through which these screws 69 and 70 pass. The link 71 is pivoted to a rock lever 73 which in turn is pivoted at 74 to an arm 75 projecting laterally from the collar 50 clamped to the needle bar. The rock lever 73 has a horizontally projecting arm which is pivoted to this arm 75 and a vertical arm which carries a roller 76 which is mounted on a stud 77 carried by said rock lever. The roller 76 is located in a guiding slot 78 formed in a guiding member 79.

Figure 9:
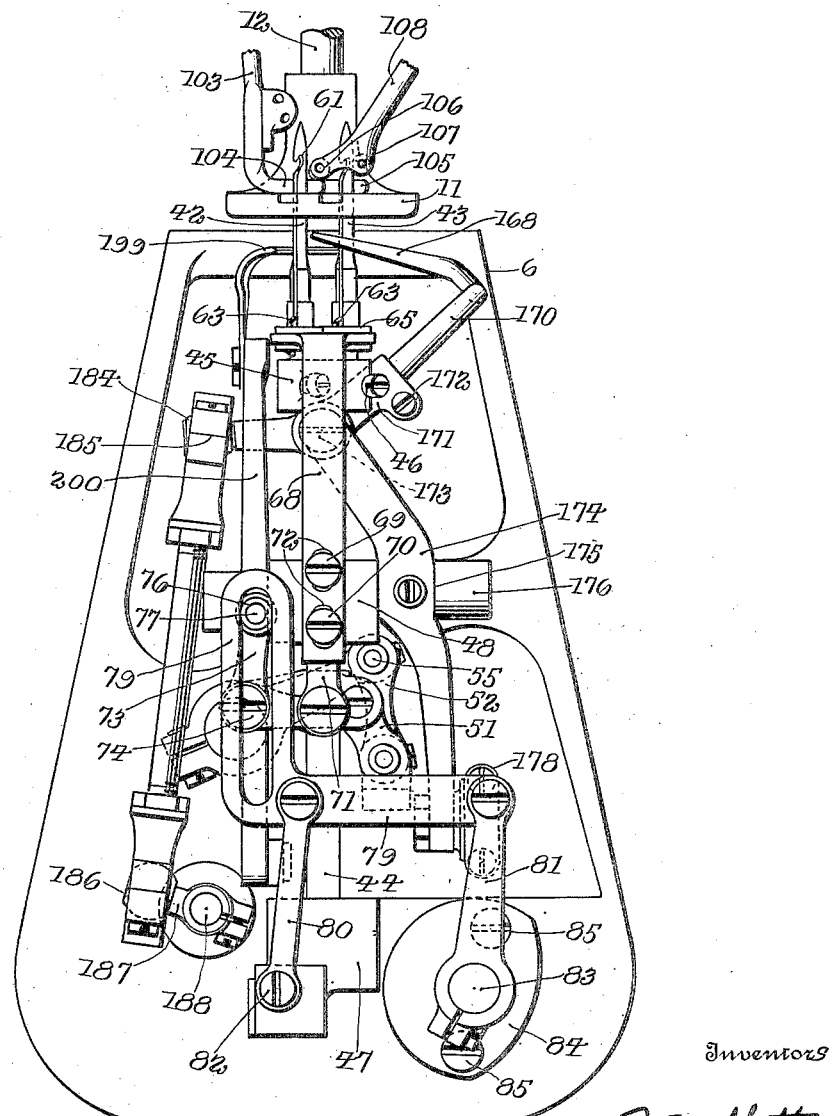
Fig. 9 is an enlarged front elevation showing the work supporting post and the operating parts located therein, also the presser foot and the thread laying devices for threading the hook needles.

This guiding member 79 has an upwardly projecting portion which contains the slot 78 and a horizontally projecting portion which is pivoted to the parallel arms 80 and 81. The arm 80 is pivoted at 82 to a lug carried by the work supporting arm, while the arm 81 is secured to a shaft 83. The shaft 83 is journaled in a projecting bearing 84 secured to the work supporting arm by screws 85, and also in a bearing at the other end of the work supporting arm (see Fig. 4). Said shaft 83 has a laterally projecting arm 86 carrying a ball-stud 87. A link 88 is attached at one end to this ball stud 87, while the other end of this link is pivoted to a ball stud 89 on a rock lever 90. The rock lever 90 is freely journaled on a cross rod 91 and is provided with an upwardly projecting arm 92 carrying a roller running in a cam groove 93 in a disk 94 on the cross shaft 3. As this cross shaft 3 rotates, the cam groove 93 will impart oscillations to the shaft 83, and this will in turn oscillate the arm 81. Inasmuch as the arms 80 and 81 are parallel and of substantially the same length, the movement of the arm 81 will cause a bodily movement of the guiding member 79 either to the right or left, as shown in Fig. 9, maintaining the slot 78 always in vertical position.

The movements of the shaft 83 are timed so that, when the needles are clear down, the latches are closed, that is, they are moved to their extreme upper positions, thus closing the throats formed by the hooks of the needles. As the needles begin their upward movements, the arm 81 is moved to the right, as viewed in Fig. 9, and this moves the guiding member 79 to the right, which swings the roller 76 and the rock lever 73 on which it is mounted. This movement of the rock lever 73 retards the movement of the arm 68, carrying the latches and the needles so that the needles move up faster than the latches, and this causes the hooks of the needles to be opened. As soon as the latches are moved to position to open the hooks, then the arm 81 ceases its movement and the roller 76 will move up along the guiding slot 78 without imparting further movements to the latches. When the needles reach the upper end of their stroke, the hooks are open so that the thread-laying devices may lay the thread in said open hooks. As the needles begin their downward movement, the shaft 83 is given a slight movement so as to move the arm 81 to the left, as viewed in Fig. 9, and this retards the downward movement of the latches so that the needles in a measure slide down the latches until the open throats of the hooks are closed. The closing of the open hooks of the needles, of course, occurs after the threads have been laid in the respective hooks, but also before the hooks pass through the material which prevents the hooks from catching the material on their downward movement.

From the above description, it will be apparent that we have provided a mechanism for moving the latches for the needles wherein the latches for the needles throughout a greater portion of their movement move with the needles and by the mechanism which moves the needles. While at the end of the strokes of said needles, said latches are given a differential movement relative to the needles so as to cause the closing of the latches in proper time to hold the thread loops and prevent the hooks of the needles from engaging the material, and also to permit the opening of the hooks so that the loops carried thereby may slide down onto the needles as the needles move up through the material.

The threads for the needles are led from the supply through the tensions 95 and 96, respectively, one of the threads being indicated at $t$ and the other at $t'$. From the tensions, the threads are led through guides 97 and 98, respectively, and thence to a movable thread guide 99 which is operated in conjunction with the cutter for pulling thread from the supply in order to give an extra length of thread for the beginning of the next stitching operation. From this movable thread guide, the two threads are led through a stationary thread guide 100. From this stationary thread guide 100, the threads are passed through thread eyes 102 on the shank 103 which carries the thread-holding fingers 104 and 105. The threads from the movable thread eyes 102 are then led through a second stationary thread guide 101. From this guide 101, the threads pass respectively through the thread carriers 106 and 107. These thread carriers 106 and 107, together with the coöperating thread-holding fingers 104 and 105, lay the threads into the hooks of the respective needles.

The thread carriers 106 and 107 are mounted on a supporting shank 108 carried by a supporting rod 109. Both of the thread carriers are operated simultaneously by the same mechanism, and their movements relative to their respective needles are precisely the same. The same is true of the thread-holding fingers and, therefore, the operation of one thread finger and one thread carrier in connection with one needle only will be described.

The support 109 is clamped in a collar 110 at its upper end which is formed integral with an arm 111 carried by a sleeve 112. The sleeve is mounted so as to oscillate freely on a stud 113 and is held thereon by a screw 114 which forms the outer abutment for the sleeve, while an integral flange 115 forms the inner abutment for said sleeve. The stud 113 is pivoted to a bracket 116 by means of a pivot stud 117. The bracket 116 is held on the upper end of the guide bar 13 by means of a clamping screw 118. The purpose of this connection of the support 109 to the guide bar 13 is to permit the support 109 to have a universal movement and, at the same time, said support 109 moves up and down with the guide bar 13 and with the presser bar and presser foot which are connected thereto. The support 109 intermediate its ends extends freely through a ball bearing 119 which is mounted in the outer end of an arm 120, said arm being split and formed with a socket for the ball and the split end of the arm is joined to the arm by screws 121. The arm 120 is integral with a collar 122 which is clamped to the outer end of a shaft 123 by means of clamping screws 124. The shaft 123 is mounted in suitable bearings in the overhanging arm, and this shaft is not only oscillated but is also moved endwise. Said shaft is oscillated by means of a link 125 which is connected to a ball stud on an arm 126 rigidly attached to the shaft.

The link 125 at its other end is pivoted at 127 to an arm 128 carried by a sleeve freely mounted on the cross rod 130. This sleeve carries a second arm 131 having a roller running in a cam groove 132 in a disk 133 on the cross shaft 3. The shaft 123 is moved endwise by a link 134. This link is pivoted to a ball stud 135 carried by a collar 136 fixed to the end of the shaft. The other end of the link 134 engages a ball stud 137 carried by an arm 138 which is formed integral with a sleeve 139. The sleeve 139 carries a second arm 140 which is provided with a roller 141 running in a cam groove in a disk 142 on the cross shaft 3. The cam groove in the disk 142 and the cam groove and the disk 133 are so constructed as to oscillate and move the shaft 123 endwise in order to give the proper movements to the thread-carrying devices. These combined movements of the shaft 123 cause the thread-laying devices to cross the path of the needles when the needles are down, and then to retract and swing around the needles to lay the threads in the hooks of the needles.

The thread-holding fingers 104 and 105, as above noted, are mounted on a common shank 103. The thread-holding finger 104 coöperates with the needle 43, while the thread-holding finger 105 coöperates with the needle 42. The shank 103 supporting these thread-holding fingers is fixed to a supporting rod 143. This supporting rod is clamped in a collar 144 formed integral with an arm 145. Said arm 145 carries a sleeve 146 which is freely mounted on an arm 147 which in turn is pivoted at 148 to a collar 149 on the guide bar 13. This connection between the supporting rod for the thread-holding fingers and the guide bar 13 is similar to the connection between the supporting rod for the thread-carrying devices and this guide bar 13, and further detail description thereof is not thought necessary.

The supporting rod 143 for the thread-holding fingers extends through a sleeve 150, which carries a ball that is journaled in the outer end of an arm 151. This construction is similar to the ball and sleeve connection between the arm 120 and the supporting rod 109. The arm 151 is fixed to the outer end of a shaft 152. The shaft 152 is journaled in the overhanging arm of the machine and is moved endwise and oscillated so as to give a movement to the thread-holding fingers which is across the path of the needle, and then to one side so as to withdraw the thread-holding fingers from beneath the threads. Said shaft 152 is oscillated by a link 153. The link 153 is connected to a ball stud 154 on the outer end of an arm 155 which is formed integral with a sleeve 156 clamped to the end of the shaft 152. The link 153 at its lower end is pivotally connected to an arm 157 which is formed integral with a sleeve 158. The sleeve 158 carries a second arm 159 which is provided with a roller running in a cam groove in a disk 160. The shaft 152 is moved endwise by a link 161 which is pivotally connected to a ball stud carried by a sleeve 162 formed on the end of the shaft 152. The other end of the link 161 is pivoted at 163 to an arm 164 formed integral with the sleeve 165. This sleeve 165, and also the sleeve 158 are freely mounted on the cross rod 130. The sleeve 165 carries a second arm 166 which is provided with a roller running in a cam groove in a disk 167 which is attached to the cross shaft 3. The cam grooves in the disks 160 and 167 are so proportioned as to give the proper movements to the thread-holding fingers.

The movements of the thread-holding fingers and the thread-carrying devices will be made clear from the several positions shown in Figs. 17 to 22, inclusive, of the drawings. We will describe the operation of a single thread-carrying device and a single thread-holding finger in connection with one of the needles. In Fig. 17 the thread-holding finger has moved across the path of the needle into engagement with the thread which extends from the thread carrier down through the previous needle puncture, around the hook of the needle, and back up again to said needle puncture. The feed of the material has just taken place. No matter what may have been the direction of the feed of the material, the thread will be held by this thread-holding finger at a point directly in rear of where the needle comes up through the fabric and by "in rear" we mean directly back of the hook of the needle. The thread-laying device is at this time at one side of the needle. In Fig. 18 the thread-carrying device has moved away from the position at the side of the needle, the thread being held around the thread holding finger in rear of the needle. The needle is now coming up through the fabric and has substantially reached the upper end of its stroke. In Fig. 19 of the drawings, the needle is at the upper end of the stroke, the latch is retracted, as described above, so that the throat of the hook needle is open to receive the thread. The thread-laying finger is moved to a position around at the other side of the needle, and thus the thread is drawn around against the shank of the needle and into the hook. In Fig. 20, the needle has moved downwardly to a slight extent, so that the hook thereof is just about at the upper face of the material. The thread-laying device remains substantially at a dwell, but the thread-holding finger has moved laterally away from the needle and has been retracted from beneath the needle thread so that, as the needle continues its downward movement, the thread may be drawn down onto the material. In Fig. 21, the thread-carrying device has moved across the path of the needle to the other side thereof and the thread-holding finger has moved upward a short distance. In Fig. 22 of the drawings, the thread-holding finger has moved across the path of the needle to a position where it may be moved backward and engage the thread extending between the thread-carrying device and the material. It will thus be seen that the thread-carrying device moves across the path of the needle, then dwells, while the thread-holding finger moves across the path of the needle and engages the thread extending between the thread-carrying device and the material. The thread-holding finger then dwells, while the thread carrying device moves around the needle to the other side thereof laying its thread in the hook of the needle. At this point, the thread-carrying device again dwells, while the thread-holding finger is retracted from beneath the needle thread so that it may be drawn down onto the material.

From Figs. 23 and 24 of the drawings, it will be apparent that the thread which is laid over the thread-holding finger will be held well up by said finger so that the thread-carrying device lays the thread around the shank of the needle and into the hook of the needle in a plane substantially at right angles to the axis of the needle. This insures the thread being laid into the hook of the needle. The thread-holding finger then performs two functions, first, it positions the thread in rear of the hook of the needle for threading the needle regardless of the direction of feed, and, second, it holds the thread well up on the shank of the needle so as to insure the thread being thrown into the hook of the needle by the thread-laying device. By our improved machine, wherein the thread-holding finger performs the function of the feed as to the positioning of the thread in rear of the hook of the needle, the feed of the material may be in any direction relative to the needle without disturbing the formation of the stitches.

As above noted, the thread-holding fingers and the thread-carrying devices are attached to the guide bar which is connected to the presser foot so that, when the presser foot is raised automatically, as above described, these thread-laying fingers and the thread-carrying devices will also be raised and will, therefore, maintain a definite position relative to the upper face of the presser foot. This enables these thread-holding devices to be placed very close to the presser foot, and still permit the presser foot to move up and down within certain limits for varying thicknesses of material. It also permits the presser foot to be raised to allow the feed of said material without said foot striking the thread-carrying devices or the thread-holding fingers.

In order that the needle thread loops beneath the material may be properly placed in a pre-determined position relative to the needles so as to insure the formation of stitches, regardless of the direction of feed, we have provided a loop-positioner for each needle. These loop-positioners are indicated at 168 and 169, respectively. The loop-positioners are carried by a shank 170 which is clamped in a support 171 by means of a clamping screw 172. The support 171 is pivoted at 173 to a lever 174. The lever 174 is pivoted at 175 to a projecting lug 176 carried by the work supporting arm. The lower end of the lever 174 carries a ball stud 177 to which a link 178 is pivotally connected. The link 178 extends through the work supporting arm into the standard at the rear of the machine where it is pivoted to a ball stud 179 carried by an arm 180. The arm 180 is integral with a sleeve 181 freely mounted on the cross rod 91. The sleeve 181 carries a second arm 182 which is provided with a roller running in a cam groove in a disk 183 fixed to the cross shaft 3. As this cam disk rotates, the lever 174 will be oscillated through said link connection. The support 171 for the loop holders extends beyond its pivot 173 and is provided with a ball stud 184. A link 185 engages this ball stud at its upper end, while the lower end of said link engages a ball stud 186 carried by an arm 187, clamped to the end of a shaft 188. The shaft 188 is journaled in the work supporting arm, and this shaft is oscillated by an arm 189. The arm 189 is connected to a link 190. This link is pivoted at its upper end to a ball stud 191 carried by an arm 192. The arm 192 is formed integral with a sleeve 193 on the cross rod 91. Said sleeve 193 carries a second arm 194 (see Fig. 32), which is provided with a ball stud running in a cam groove 195 in a disk 196 on the main or cross shaft 3.

The oscillations of the shaft 188 will oscillate the support 171 for the loop-placing devices, while the movements of the lever 174 will give a bodily lateral movement to the shank of the loop-placing devices. These two combined movements cause the loop-holding devices to move across the path of the needles against the shank of the thread loops carried by the needles and to hold the shanks of these thread loops directly in rear of the hook of the needles, regardless of the direction of feed of the material. When the needles are at the lower ends of their strokes and begin their upward movement, these loop-placing devices engage the loops on the needles and position the same as above stated. If the feed of the material should even be in a forward direction, that is, toward the hooks of the needles, still these loop-placing devices will engage the shanks of the needle loops between the hooks of the needles and the material and carry these shanks directly backward away from the hooks of the needles so that, when the needles come up, the points of the needles will with certainty pass up through these previously formed loops so that, when they are again threaded, the needles will draw new loops down through the previously formed loops and thus enchain or lock the same. After the needles have entered their loops, then the loop placing devices move laterally so as to be retracted from beneath the thread loops and allow the same to be drawn up tightly against the material. These thread loop-placing devices perform the function of placing the loops which is usually performed by the feed, and thus we are able to feed the material, as above noted, in any direction without in any way interfering with the formation of the stitches.

In operation, the machine is stopped when the needles are beneath the work support and at this time the presser foot is raised through the automatic means which lifts the same. The material is inserted underneath the presser foot and the machine started. The needles come up through the material, are threaded, and draw their loops down through the material. The needles come up through their own loops again and seize new loops of thread which are drawn down through the previously formed loops, and thus the thread loops are enchained. When the new thread loops are drawn down through the previously formed loops and the needles are again at the lower end of their strokes, the presser foot is automatically raised. The operator then draws the material in the direction in which it is desired to feed the material, and this may be in any direction relative to the needles, either forwardly, backwardly, to the right, or to the left. As the needles come up the presser foot comes down, the thread is slackened through the upward movements of the needles, and the down movement of the thread-carrying devices, and this enables the operator to pull the material to a certain extent and this extent of movement of the material, that is, the extent of hand feed, will be determined by the amount of slack thread given to the normal stitch forming operation and, therefore, the length of stitch will be substantially uniform.

In order that this feed may be in any direction relative to the needle, the loop-placing devices engage the loops of the needle threads and place the shanks of these loops directly in rear of the hooks of the needles. Then again, in order that the needles may be properly threaded, regardless of the direction of movement of the material, the thread holding fingers above the presser foot engage the threads between the thread-carrying devices and the material and place these threads in rear of the hooks of the needles so that the thread-carrying devices will lay the threads around the needles into the open hooks. As above noted, there are two needles in our machine, as illustrated, and these two needles, as appears clearly from Figs. 17 to 22, inclusive, are located in a plane which cuts the longitudinal axis of the work support at an acute angle, this angle being substantially forty-five degrees.

In Fig. 30 of the drawings, we have shown, more or less diagrammatically, the position of the needles relative to the work support. The needles are indicated at 42 and 43, while the longitudinal axis of the work support is indicated by the line $x$—$x$. The material to be stitched is indicated at M. This material has a cut or tear indicated by the line $y$—$y$. The operator, in order to close this cut or opening by our improved darning machine, feeds the material by hand first in a direction so that stitches are laid to the points $a$—$a$, and then in a direction so that stitches are laid to the points $b$—$b$, and then in a direction so that stitches are laid to the points $c$—$c$, and so on, as indicated in the drawings, and in this manner the enchained loops may be laid in lines zigzag back and forth across the cut or tear in the material, and these enchained loops will cross each other thus completely closing the entire cut or tear.

Figure 10:
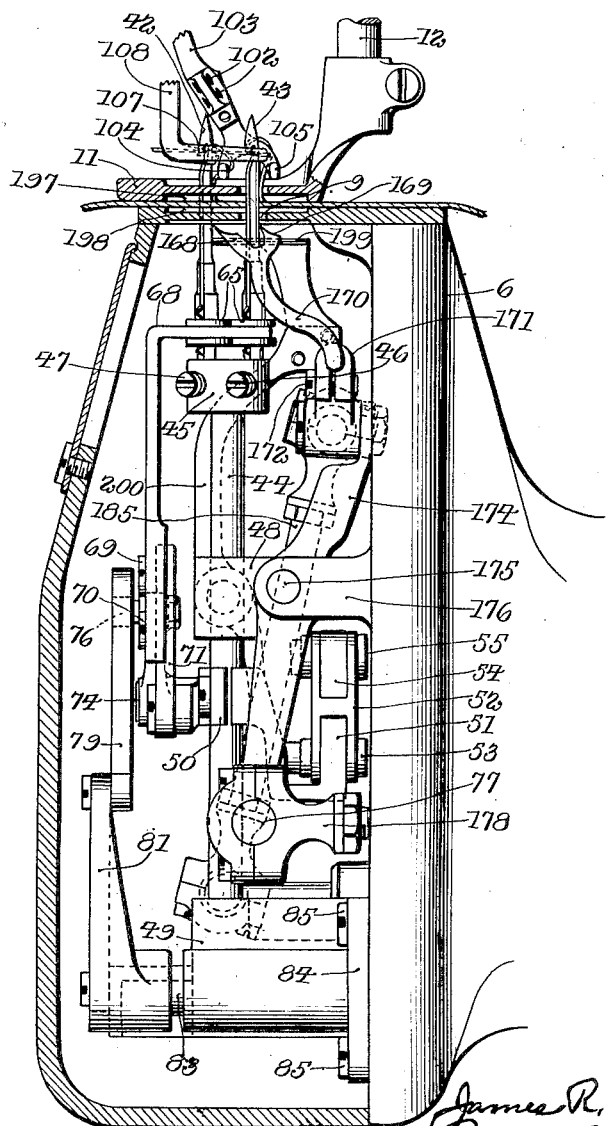
Fig. 10 is a sectional view through the work supporting post and the presser foot, showing the parts located within the work supporting post, and also the thread carrying devices, said thread carrying devices being positioned for laying the threads in the hooks of the needles.

The presser foot is cut-away underneath the same, as indicated at 197 (see Fig. 10 of the drawings). The work support also has a recess 198 in its upper face. These recesses are circular in outline and extend a sufficient distance from the needle holes so that the enchained thread loops extending from the last formed stitch to the point where the needle is entering the material would lie within the recess and this permits the threads to be drawn up and the stitch set, notwithstanding that the presser foot clamps the material very firmly.

The thread guides 102 in the shank of the thread fingers serve to pull-off thread from the supply. When the needles begin the first part of their downward movement, the thread-holding fingers are retracted from underneath the needle threads and this retracting movement pulls thread from the supply. As soon as the points of the needles pass beneath the material, the thread fingers begin their forward movement and give up thread pulled off by the needles.

While we have described our invention as embodied in a single thread chain stitch machine, it will be obvious that the loop-placing devices which coöperate with the needles beneath the work support may likewise be used in a two thread chain stitch mechanism, in which case they will engage the thread of the loop to be entered by the needle in the concatenating of the loops to form the stitches and place the loop so that the needle will with certainty enter the same regardless of the direction of feed of the material. In other words, the loop-placing devices would perform the same function in a two thread machine as in a single thread machine. Likewise, in place of our hook needles, we may also use eye pointed needles, operating either to form a single thread chain stitch or a two thread chain stitch.

To facilitate the removal of the material after the completion of a stitching operation, we have provided the machine with a cutting device which we will describe briefly, although the same forms the subject-matter of a copending application filed of even date herewith. Said cutting device includes a cutting knife 199. This knife is carried by a lever 200 (see Fig. 31). The lever is pivoted at 201 to a lug projecting from the work supporting arm. Said lever at its lower end is connected at 202 to a link 203. The link 203 extends into the standard 2 and is pivoted at 204 to an arm 205 (see Fig. 11). The arm 205 is fixed to a shaft mounted in a bearing 206. This shaft extends out through the standard and carries an arm 207 on its outer end. The arm 207 is pivoted to a bar 208 which extends upwardly along the standard. A lever 209 is pivoted at 210 to the overhanging arm. This lever is connected to a rod 211 which may in turn be connected to a suitable knee shift or treadle. This lever carries a pin, indicated in dotted lines at 212, which extends into a slot 213 in the bar 208. The extreme left hand end of the lever 209 is bent downwardly at 214. On the end of the shaft 3 is a hand pulley 215 which has a laterally extending flange 216 with a cut-away section 217, indicated in full lines in Fig. 11, and in dotted lines in Fig. 31. When the machine is stopped with the needles clear down, this cut-away section 217 is directly underneath the end 214 of the lever 209. The operator may depress the lever, and as the lever moves downward the pin 212 will engage the bar 208 which in turn will oscillate the shaft connected to the link 203, and this will move the lever carrying the cutter so as to bring the cutter blade against the loops of the threads extending from the needles to the material. The cutter is so positioned relative to the needles as to cut the loop between the needle and the previous stitch in the material.

The thread guides 99 referred to above are carried by an arm 218 which is fixed to a lever 219 pivoted at 220 to the overhanging arm (see Fig. 7). The outer end of the lever is provided with a ball stud 221 and a link 222 is connected to this ball stud at its lower end. Said link is pivoted to a ball stud 223 carried by the lever 209 at its upper end. Said lever 209 extends through a guiding slot 224 in a bracket 225. A spring 226 is attached at its upper end to the lever 209 and at its lower end to the overhanging arm, and this spring normally tends to hold the outer end of the lever 209 depressed and the parts in the position shown in Fig. 7. In Fig. 31 of the drawings, we have shown the treadle depressed which pulls down on the lever 209. The first movement of the lever 209 imparts no movements whatever to the cutter but swings the lever 219 carrying the thread eyes 99. This movement of the thread eyes pulls the thread from the supply. A further movement of the lever 209 causes the pin 212 to engage the ends of the slot 213 and thus operate the cutter. By our improved device the thread loops are cut beneath the material and the friction of the threads in the material when the material is drawn from the machine will take up the thread which is pulled off and released as soon as the cutter is released, and this insures that the end of the thread will be drawn well out from under the presser foot so as to be clamped thereby at the beginning of the next stitching operation.

It is obvious that minor changes in the details of construction and the arrangement of parts may be made without departing from the spirit of this invention as set forth in the appended claims.

Having thus described the invention, what is claimed as new is:—

1. The combination with a stitch forming mechanism including a hook needle and coöperating devices operating to form chain loops, of means coöperating with said stitch forming mechanism for engaging the needle loop while held by the hook of the needle for positioning the same to insure the formation of stitches when the material is fed in any direction relative to the needle.

2. The combination with stitch-forming mechanism including a hook needle, of a loop-positioner coöperating with said stitch-forming mechanism for engaging the loop of the thread to be entered by the needle in the concatenating of the stitching thread for placing said thread loop in a predetermined position relative to the needle regardless of the direction of feed of the material.

3. The combination with a stitch-forming mechanism including a hook needle, of a loop-positioner coöperating with said stitch-forming mechanism for engaging the loop of thread to be entered by the needle in the concatenating of the stitching thread between the path of the needle and the material for positively placing the thread loop in a predetermined position relative to the needle whereby the material may be fed in any direction without interfering with the formation of the stitches.

4. The combination with a stitch-forming mechanism including a hook needle and coöperating devices for forming chain loops, means for reciprocating the needle, means for holding the needle against oscillation, and means coöperating with said stitch-forming mechanism for insuring the formation of stitches when the material is fed in any direction relative to the needle.

5. The combination of stitch-forming mechanism including a needle and coöperating devices operating to form chain loops, means coöperating with said stitch-forming mechanism for insuring the formation of stitches when the material is fed in any direction relative to the needle, a work support, a presser foot, and means for positively raising the presser foot when the needle is withdrawn from the material to allow the material to be fed by hand.

6. The combination of stitch-forming mechanism including a needle and coöperating devices operating to form chain loops, a loop-positioner coöperating with said stitch-forming mechanism for engaging the loop of the thread to be entered by the needle in the concatenating of the stitching thread for placing said thread loop in a predetermined position relative to the needle, a work support, a presser foot, and means for positively raising the presser foot when the needle is withdrawn from the material to allow the material to be fed by hand.

7. The combination of stitch-forming mechanism including a needle and coöperating devices operating to form chain loops, a work support, a presser foot, said needle being mounted beneath the work support and moving through the work support to engage the material, means for preventing the presser foot from being raised by the needle as it penetrates the material, and means for positively raising the presser foot when the needle is withdrawn from the material to allow the material to be fed by hand.

8. The combination of stitch-forming mechanism including a needle, a loop-positioner coöperating with said stitch-forming mechanism for engaging the loop of thread to be entered by the needle in the concatenating of the stitching thread for placing said thread loop in a predetermined position relative to the needle, a work support, a presser foot, said needle being mounted beneath the work support and passing through the same and the material, means for yieldingly forcing the presser foot against the work support, and means for positively preventing the presser foot from being raised by the needle as it is entering the material.

9. The combination of stitch-forming mechanism including a needle, a loop-positioner coöperating with said stitch-forming mechanism for engaging the loop of thread to be entered by the needle in the concatenating of the stitching thread for placing said thread loop in a predetermined position relative to the needle, a work support, a presser foot, said needle being mounted beneath the work support and passing through the same and the material, means for yieldingly forcing the presser foot against the work support, means for positively preventing the presser foot from being raised by the needle as it is entering the material, and automatic means for positively raising the presser foot when the needle is withdrawn from the material to allow the material to be fed by hand.

10. The combination with stitch-forming mechanism including a needle and coöperating devices for forming a series of enchained loops from a single thread, of a loop positioner coöperating with said stitch-forming mechanism for engaging the loop of thread to be entered by the needle for positioning said loop in a predetermined position relative to the needle regardless of the direction of feed of the material.

11. The combination with stitch-forming mechanism including a hook needle and coöperating devices for forming a series of enchained loops from a single thread, means for reciprocating the needle, means for holding the needle against oscillation about its axis, and means coöperating with said stitch-forming mechanism for insuring the formation of stitches when the material is fed in any direction relative to the needle.

12. The combination with stitch-forming mechanism including a needle and coöperating devices for forming a series of enchained loops from a single thread, of a loop positioner coöperating with the stitch-forming mechanism for engaging the loop of thread to be entered by the needle for positioning said loop in a predetermined position relative to the needle, a presser foot, a work support, and means for automatically raising the presser foot when the needle is withdrawn from the material to permit said material to be fed by hand.

13. The combination with stitch-forming mechanism including a needle and coöperating devices for forming a series of enchained loops from a single thread, of a loop positioner coöperating with said stitch-forming mechanism for engaging a loop of thread to be entered by said needle for positioning said loop in a predetermined position relative to the needle, a work support, a presser foot, means for yieldingly forcing the presser foot against the work support, said needle being located beneath the work support and passing up through the same into the material, and means for preventing the presser foot from being raised by the needle as it enters the material.

14. The combination with stitch-forming mechanism including a needle and coöperating devices for forming a series of enchained loops from a single thread, of a loop-positioner coöperating with said stitch-forming mechanism for engaging a loop of thread to be entered by said needle for positioning said loop in a predetermined position relative to the needle, a work support, a presser foot, means for yieldingly forcing the presser foot against the work support, said needle being located beneath the work support and passing up through the same into the material, means for preventing the presser foot from being raised by the needle as it enters the material, and automatic means for lifting the presser foot when the needle is beneath the material to permit said material to be fed by hand.

15. The combination of stitch-forming mechanism including a needle, and coöperating devices for forming a series of enchained loops from a single thread, a work support, a presser foot for holding the material on the work support, said needle being located beneath the work support and passing up through the same into the material, means for reciprocating the needle, means for holding the needle against oscillation about its axis, and means coöperating with the stitch-forming mechanism to insure the formation of stitches when the material is fed by and in any direction relative to the needle.

16. The combination of stitch-forming mechanism including a needle, and coöperating devices for forming a series of enchained loops from a single thread, a work support, a presser foot for holding the material on the work support, said needle being located beneath the work support and passing up through the same into the material, means for reciprocating the needle, means for holding the needle against oscillation about its axis, means coöperating with the stitch-forming mechanism for insuring the formation of stitches, and means for automatically raising the presser foot when the needle is beneath the material so as to permit the material to be fed by hand.

17. The combination of stitch-forming mechanism including a needle and coöperating devices for forming a series of enchained loops from a single thread, a work support, a presser foot for holding the material on the work support, said needle being located beneath the work support and passing up through the same into the material, means for reciprocating the needle, means for holding the needle against oscillation about its axis, means coöperating with the stitch-forming mechanism for insuring the formation of stitches, means for automatically raising the presser foot when the needle is beneath the material so as to permit the material to be fed by hand, and means for positively preventing the raising of the presser foot by the needle as it enters the material.

18. The combination of stitch forming mechanism including a hook needle, coöperating devices for laying a thread in the hook of said needle, a work support, a presser foot, and means coöperating with the needle for insuring the formation of stitches when the material is fed in any direction relative to the needle.

19. The combination of stitch-forming mechanism including a hook needle, coöperating devices for laying a thread in the hook of said needle, a work support, a presser foot, and a loop-positioner coöperating with the needle beneath the work support for engaging the loop of thread on the needle and placing the same in a predetermined position relative to the needle regardless of the direction of feed of the material.

20. The combination of stitch-forming mechanism including a hook needle, coöperating devices for laying a thread in the hook of said needle, a work support, a presser foot, a loop-positioner coöperating with the needle beneath the work support for engaging the loop of thread on the needle and placing the same in a predetermined position relative to the needle regardless of the direction of feed of the material, means for yieldingly forcing the presser foot against the work support, and means for automatically raising the presser foot to permit the feed of the material when the needle is beneath the work support.

21. The combination of stitch-forming mechanism including a hook needle, coöperating devices for laying a thread in the hook of said needle, a work support, a presser foot, a loop-positioner coöperating with the needle beneath the work support for engaging the loop of thread on the needle and placing the same in a predetermined position relative to the needle regardless of the direction of feed of the material, means for yieldingly forcing the presser foot against the work support, means for automatically raising the presser foot to permit the feed of the material when the needle is beneath the work support, and means for preventing the presser foot from being raised by the needle as it enters the material.

22. The combination of stitch-forming mechanism including a hook needle, a thread-carrying device for laying a thread in the hook of a needle, and a thread-holding finger for engaging the thread between the carrier and the material for positioning said thread in a predetermined position relative to the needle regardless of the direction of feed.

23. The combination of stitch-forming mechanism including a hook needle, a thread-carrying device for laying a thread in the hook of a needle, a thread-holding finger for engaging the thread between the carrier and the material for positioning said thread in a predetermined position relative to the needle regardless of the direction of feed, a work support, a presser foot, means for yieldingly forcing the presser foot against the work support, said needle being located beneath the work support and passing up through the same to enter the material.

24. The combination of stitch-forming mechanism including a hook needle, a thread-carrying device for laying a thread in the hook of a needle, a thread-holding finger for engaging the thread between the carrier and the material for positioning said thread in a predetermined position relative to the needle regardless of the direction of feed, a work support, a presser foot, means for yieldingly forcing the presser foot against the work support, said needle being located beneath the work support and passing up through the same to enter the material, and means for automatically raising the presser foot when the needle is beneath the material to permit said material to be fed by hand.

25. The combination of stitch-forming mechanism including a hook needle, a thread-carrying device for laying a thread in the hook of a needle, a thread-holding finger for engaging the thread between the carrier and the material for positioning said thread in a predetermined position relative to the needle regardless of the direction of feed, a work support, a presser foot, means for yieldingly forcing the presser foot against the work support, said needle being located beneath the work support and passing up through the same to enter the material, means for automatically raising the presser foot when the needle is beneath the material to permit said material to be fed by hand, and means for positively preventing the presser foot from being raised by the needle as it enters the material.

26. The combination of stitch-forming mechanism including a work support, a presser foot, a presser bar carrying said presser foot, a hook needle mounted beneath the work support and passing up through the same to enter the material, a thread-carrying device above the presser foot for laying a thread in the hook of the needle, a thread finger engaging the thread between the thread-carrying device and the material for placing the thread in a predetermined position relative to the needle regardless of the direction of feed of the material, said thread-carrying device and said thread finger being connected to and movable up and down with the presser foot.

27. The combination of stitch-forming mechanism including a work support, a presser foot, a presser bar carrying said presser foot, a hook needle mounted beneath the work support and passing up through the same to enter the material, a thread-carrying device above the presser foot for laying a thread in the hook of the needle, a thread finger engaging the thread between the thread-carrying device and the material for placing the thread in a predetermined position relative to the needle regardless of the direction of feed of the material, said thread-carrying device and said thread finger being connected to and movable up and down with the presser foot, means for yieldingly forcing the presser foot toward the work support, and means for preventing the presser foot from being raised by the needle as it enters the material.

28. The combination of stitch-forming mechanism including a work support, a presser foot, a presser bar carrying said presser foot, a hook needle mounted beneath the work support and passing up through the same to enter the material, a thread-carrying device above the presser foot for laying a thread in the hook of the needle, a thread finger engaging the thread between the thread carrying device and the material for placing the thread in a predetermined position relative to the needle regardless of the direction of feed of the material, said thread-carrying device and said thread finger being connected to and movable up and down with the presser foot, means for yieldingly forcing the presser foot toward the work support, and means for automatically raising the presser foot when the needle is beneath the material to permit the feed of said materal.

29. The combination of stitch-forming mechanism including a work support, a presser foot, a presser bar carrying said presser foot, a hook needle mounted beneath the work support and passing up through the same to enter the material, a thread-carrying device above the presser foot for laying a thread in the hook of the needle, a thread finger engaging the thread between the thread-carrying device and the material for placing the thread in a predetermined position relative to the needle regardless of the direction of feed of the material, said thread carrying device and said thread finger being connected to and movable up and down with the presser foot, means for yieldingly forcing the presser foot toward the work support, means for automatically raising the presser foot when the needle is beneath the material to permit the feed of said material, and means for positively preventing the presser foot from being raised by the needle as it enters the material.

30. The combination of a work support, a presser foot, means for yieldingly forcing the presser foot against the work support, stitch forming mechanism including a hook needle mounted beneath the work support and movable up through the work support to engage the material, and a positively actuated latch for closing the hook of the needle, a thread-carrying device above the presser foot, a thread finger for engaging the thread between the thread-carrying device and the material for placing said thread in a predetermined position relative to the needle regardless of the direction of feed, and means coöperating with the needle beneath the work support for placing the thread loop on the needle in a predetermined position relative to the needle regardless of the direction of feed.

31. The combination of a work support, a presser foot, means for yieldingly forcing the presser foot against the work support, stitch forming mechanism including a hook needle mounted beneath the work support and movable up through the work support to engage the material, a positively actuated latch for closing the hook of the needle, a thread-carrying device above the presser foot, a thread finger for engaging the thread between the thread-carrying device and the material for placing said thread in a predetermined position relative to the needle regardless of the direction of feed, and means coöperating with the needle beneath the work support for placing the thread loop on the needle in a predetermined position relative to the needle regardless of the direction of feed, said thread-carrying device and said thread finger being connected to the presser foot and movable up and down with the same.

32. The combination of a work support, a presser foot, means for yieldingly forcing the presser foot against the work support, stitch-forming mechanism including a hook needle mounted beneath the work support and movable up through the work support to engage the material, a positively actuated latch for closing the hook of the needle, a thread-carrying device above the presser foot, a thread finger for engaging the thread between the thread-carrying device and the material for placing said thread in a predetermined position relative to the needle regardless of the direction of feed, means coöperating with the needle beneath the work support for placing the thread loop on the needle in a predetermined position relative to the needle regardless of the direction of feed, and means for automatically raising the presser foot when the needle is beneath the material to permit the feed of said material by hand.

33. The combination of a work support, a presser foot, means for yieldingly forcing the presser foot against the work support, stitch-forming mechanism including a hook needle mounted beneath the work support and movable up through the work support to engage the material, a positively actuated latch for closing the hook of the needle, a thread-carrying device above the presser foot, a thread finger for engaging the thread between the thread-carrying device and the material for placing said thread in a predetermined position relative to the needle regardless of the direction of feed, means cooperating with the needle beneath the work support for placing the thread loop on the needle in a predetermined position relative to the needle regardless of the direction of feed, and means for preventing the presser foot from being raised by the needle as it enters the material.

34. The combination of a work support, a presser foot, means for yieldingly forcing the presser foot against the work support, stitch-forming mechanism including a hook needle mounted beneath the work support and movable up through the work support to engage the material, a positively actuated latch for closing the hook of the needle, a thread-carrying device above the presser foot, a thread finger for engaging the thread between the thread carrying device and the material for placing said thread in a predetermined position relative to the needle regardless of the direction of feed, means cooperating with the needle beneath the work support for placing the thread loop on the needle in a predetermined position relative to the needle regardless of the direction of feed, means for preventing the presser foot from being raised by the needle as it enters the material, and means for automatically raising the presser foot when the needle is beneath the material to permit said material to be fed by hand.

35. The combination of a work support, a presser foot, stitch-forming mechanism including a hook needle mounted beneath the work support and movable up through the same to enter the material, a thread-carrying device for laying a thread in the hook of the needle, a thread finger for engaging the thread between the thread-carrying device and the material for placing the thread in a predetermined position relative to the needle, and a loop-holder for engaging the thread loop on the hook of the needle beneath the work support and placing said loop in a predetermined position relative to the needle regardless of the direction of feed.

36. The combination of a work support, a presser foot, stitch-forming mechanism including a hook needle mounted beneath the work support and movable up through the same to enter the material, a thread-carrying device for laying a thread in the hook of the needle, a thread finger for engaging the thread between the thread-carrying device and the material for placing the thread in a predetermined position relative to the needle, a loop holder for engaging the thread loop on the hook of the needle beneath the work support and placing said loop in a predetermined position relative to the needle regardless of the direction of feed, and means for yieldingly forcing the presser foot against the work support, said thread-carrying device and said thread finger being connected to the presser foot and movable up and down therewith.

37. The combination of a work support, a presser foot, stitch forming mechanism including a hook needle mounted beneath the work support and movable up through the same to enter the material, a thread-carrying device for laying a thread in the hook of the needle, a thread finger engaging the thread between the thread-carrying device and the material for placing the thread in a predetermined position relative to the needle, a loop holder for engaging the thread loop on the hook of the needle beneath the work support and placing said loop in a predetermined position relative to the needle regardless of the direction of feed, and means for automatically raising the presser foot when the needle is beneath the material to permit said material to be fed by hand in any direction.

38. The combination of a work support, a presser foot, stitch-forming mechanism including a hook needle mounted beneath the work support and movable up through the same to enter the material, a thread-carrying device for laying a thread in the hook of the needle, a thread finger for engaging the thread between the thread-carrying device and the material for placing the thread in a predetermined position relative to the needle, a loop holder for engaging the thread loop on the hook of the needle beneath the work support and placing said loop in a predetermined position relative to the needle regardless of the direction of feed, means for automatically raising the presser foot when the needle is beneath the material to permit such material to be fed by hand in any direction, and means for positively preventing the presser foot being raised by the material as the needle penetrates the same.

39. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, and means for moving said thread-carrying device about the needle for laying a thread in the hook of the needle.

40. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread-carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material.

41. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread-carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material, said means for operating the thread finger also withdrawing the thread finger from engagement with the thread while the needle is above the material.

42. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread-carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material, said means for operating the thread finger also withdrawing the thread finger from engagement with the thread while the needle is above the material, and means for automatically raising the presser bar when the needle is beneath the material to permit the material to be fed by hand.

43. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread-carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material, said means for operating the thread finger also withdrawing the thread finger from engagement with the thread while the needle is above the material, and means located beneath the work support for engaging the loop of thread on the needle for placing the said loop directly in rear of the hook of the needle regardless of the direction of feed of the material.

44. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material, said means for operating the thread finger also withdrawing the thread finger from engagement with the thread while the needle is above the material, means located beneath the work support for engaging the loop of thread on the needle for placing the said loop directly in rear of the hook of the needle regardless of the direction of feed of the material, and means for automatically raising the presser foot when the needle is beneath the material to permit the material to be fed in any direction by hand.

45. The combination of a work support, a presser foot, a presser bar carrying said presser foot, a guide bar attached to said presser bar, a spring engaging said presser bar for yieldingly forcing the same against the work support, a hook needle mounted beneath the work support and passing up through the same to enter the material, a thread-carrying device mounted on the guide bar, means for moving said thread-carrying device about the needle for laying a thread in the hook of the needle, a thread finger, means for mounting said thread finger on said guide bar for moving said thread finger across the path of the needle into engagement with the thread between the thread guide and the material for placing the thread in a predetermined position relative to the needle regardless of the direction of feed of the material, said means for operating the thread finger also withdrawing the thread finger from engagement with the thread while the needle is above the material, means located beneath the work support for engaging the loop of thread on the needle for placing the said loop directly in rear of the hook of the needle regardless of the direction of feed of the material, and a device controlled by the means for operating the thread holding finger for positively preventing the raising of the presser foot by the needle as it enters the material.

46. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, and means for moving said thread-carrying device around the hook needle to lay a thread in the hook of the needle and across the path of the needle when the needle is retracted.

47. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, and means for moving said thread-carrying device around the hook needle to lay a thread in the hook of the needle and across the path of the needle when the needle is retracted, a latch, and means for operating the latch to close the hook of the needle after the thread has been laid therein and before the hook of the needle passes through the material and for opening said latch to release the thread loop on the upward movement of the needle.

48. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, means for moving said thread-carrying device around the hook needle to lay a thread in the hook of the needle and across the path of the needle when the needle is retracted, a latch, means for operating the latch to close the hook of the needle after the thread has been laid therein and before the hook of the needle passes through the material and for opening said latch to release the thread loop on the upward movement of the needle, a thread finger for engaging the thread between the thread carrier and the material for placing the thread in a predetermined position relative to the needle regardless of the direction of the feed, and means for supporting said thread and finger on said guide bar.

49. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, means for moving said thread-carrying device around the hook needle to lay a thread in the hook of the needle and across the path of the needle when the needle is retracted, a latch, means for operating the latch to close the hook of the needle after the thread has been laid therein and before the hook of the needle passes through the material and for opening said latch to release the thread loop on the upward movement of the needle, a thread finger for engaging the thread between the thread carrier and the material for placing the thread in a pre-determined position relative to the needle regardless of the direction of the feed, means for supporting said thread finger on said guide bar, and means for moving said thread finger across the path of the needle into engagement with the thread and for retracting the thread finger from underneath the thread while the needle is above the material.

50. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, means for moving said thread-carrying device around the hook needle to lay a thread in the hook of the needle and across the path of the needle when the needle is retracted, a latch, means for operating the latch to close the hook of the needle after the thread has been laid therein and before the hook of the needle passes through the material and for opening said latch to release the thread loop on the upward movement of the needle, a thread finger for engaging the thread between the thread carrier and the material for placing the thread in a predetermined position relative to the needle regardless of the direction of feed, means for supporting said thread finger on said guide bar, means for moving said thread finger across the path of the needle into engagement with the thread and for retracting the thread finger from underneath the thread while the needle is above the material, and a loop-engaging device for engaging the needle loop on the needle beneath the work support for placing said loop in a predetermined position relative to the needle regardless of the direction of feed.

51. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, means for moving said thread-carrying device around the hook needle to lay a thread in the hook of the needle and across the path of the needle when the needle is retracted, a latch, means for operating the latch to close the hook of the needle after the thread has been laid therein and before the hook of the needle passes through the material and for opening said latch to release the thread loop on the upward movement of the needle, a thread finger for engaging the thread between the thread carrier and the material for placing the thread in a predetermined position relative to the needle regardless of the direction of feed, means for supporting said thread finger on said guide bar, means for moving said thread finger across the path of the needle into engagement with the thread and for retracting the thread finger from underneath the thread while the needle is above the material, a loop-engaging device for engaging the needle loop of the needle beneath the work support for placing said loop in a predetermined position relative to the needle regardless of the direction of feed, and means for automatically raising the presser foot when the needle is beneath the material to permit said material to be fed by hand.

52. The combination of a work support, a presser foot, a hook needle mounted beneath the work support and moving through the same to enter the material, a presser bar carrying said presser foot, a guide bar attached to said presser bar, a thread-carrying device, means for supporting said thread-carrying device by said guide bar including a universal connection, means for moving said thread-carrying device around the hook needle to lay a thread in the hook of the needle and across the path of the needle when the needle is retracted, a latch, means for operating the latch to close the hook of the needle after the thread has been laid therein and before the hook of the needle passes through the material and for opening said latch to release the thread loop on the upward movement of the needle, a thread finger for engaging the thread between the thread carrier and the material for placing the thread in a predetermined position relative to the needle regardless of the direction of feed, means for supporting said thread finger on said guide bar, means for moving said thread finger across the path of the needle into engagement with the thread and for retracting the thread finger from underneath the thread while the needle is above the material, a loop-engaging device for engaging the needle loop on the needle beneath the work support for placing said loop in a predetermined position relative to the needle regardless of the direction of feed, means for automatically raising the presser foot when the needle is beneath the material to permit said material to be fed by hand, and means for positively engaging the presser bar to prevent the presser foot from being raised when the needle point is passing through the material.

53. The combination of a work support having needle openings therethrough, a recess surrounding said needle openings, a presser foot, means for yieldingly forcing the presser foot against the work support, said presser foot having needle openings in line with the needle openings in the work support, a recess in its under face surrounding said needle opening, stitch-forming mechanism including device for forming chain loops regardless of the direction of feed of the material, and means for automatically raising the presser foot when the needle is withdrawn from the material to permit the material to be fed by hand, said recesses in the work support and the presser foot extending a greater distance from the needle opening than the length of feed so that the stitching thread is free to be drawn for the setting of the stitch.

54. The combination of a work support having a needle opening and a recess in its upper face extending around said opening, a presser foot having a needle opening in line with the needle opening of the work support and a recess in its under face extending around the needle opening, means for yieldingly forcing the presser foot against the work support, a hook needle mounted beneath the work support and movable through the work support to engage the material, means above the presser foot for laying a thread in the hook of the needle, devices coöperating with the stitch-forming mechanism for insuring the formation of stitches regardless of the direction of feed of the material, and means for automatically raising the presser foot to permit the material to be fed in any direction by hand when the needle is withdrawn therefrom, said recesses in the work support and presser foot extending a greater distance from the needle opening than the length of feed so that the stitching thread is free to be drawn for the setting of the stitch.

55. The combination of a work support having a needle opening, a recess in the upper face of the work support extending about said needle opening, a presser foot having a needle opening in line with the needle opening in the work support, and a recess in its under face extending about said needle opening, a stitch-forming mechanism including devices for forming enchained loops, said recesses extending a greater distance from the needle opening than the length of the loop.

56. The combination of a work support, a presser foot, a hook needle mounted beneath the work support, a thread-carrying device for laying a thread in the hook of the needle, said thread-carrying device being mounted above the presser-foot, a thread-holding finger for engaging the thread between the thread-carrying device and the material, and devices for drawing thread from the supply as the needle begins its downward movement and for giving thread to the needle after the hook has passed through the material.

57. The combination of a work support, a presser foot, a hook needle mounted beneath the work support and moving up through the same to enter the fabric, a thread-carrying device above the presser foot, means for supporting and operating the same, a thread-holding finger for engaging the thread between the thread-carrying device and the material, means for engaging and operating said thread-holding finger, said operating means for the thread-holding finger having thread guides for engaging the thread between the thread-carrier and the supply and operating to pull thread from the supply on the first part of the downward movement of the needle and to give thread to the needle after the hook thereof has passed through the material.

58. The combination of a work support, a presser foot, a hook needle mounted beneath the work support and moving up through the same to enter the fabric, a thread-carrying device above the presser foot, means for supporting and operating the same, a thread-holding finger above the work support for engaging the thread between the thread-carrying device and the material, means for engaging and operating said thread-holding finger, said operating means for the thread-holding finger having thread guides for engaging the thread between the thread carrier and the supply and operating to pull thread from the supply on the first part of the downward movement of the needle and to give thread to the needle after the hook thereof has passed through the material, and means for engaging the needle loop beneath the material for placing the same in a predetermined position relative to the needle regardless of the direction of feed.

59. The combination of a work support, a presser foot, a hook needle mounted beneath the work support and moving up through the same to enter the fabric, a thread-carrying device above the presser foot, means for supporting and operating the same, a thread-holding finger above the work support for engaging the thread between the thread-carrying device and the material, means for engaging and operating said thread-holding finger, said operating means for the thread-holding finger having thread guides for engaging the thread between the thread carrier and the supply and operating to pull thread from the supply on the first part of the downward movement of the needle and to give thread to the needle after the hook thereof has passed through the material, and means for engaging the needle loop beneath the material for placing the same in a predetermined position relative to the needle regardless of the direction of feed, and means for automatically raising the presser foot when the needle is beneath the material to permit the material to be fed by hand.

60. The combination of a standard, a work supporting arm projecting therefrom, a work support carried thereby, an overhanging arm projecting from the standard, a plurality of hook needles mounted beneath the work support and passing up through the work support to enter the material, thread-carrying devices mounted on the overhanging arm for threading the needles, said needles being arranged in a plane cutting the longitudinal axis of the work support at an acute angle, and means coöperating with the needles for placing the loops of thread carried thereby in a predetermined position relative to their respective needles so as to insure the formation of stitches regardless of the direction of feed.

61. The combination of a standard, a work supporting arm projecting therefrom, a work support carried thereby, an overhanging arm projecting from the standard, a plurality of hook needles mounted beneath the work support and passing up through the work support to enter the material, thread-carrying devices mounted on the overhanging arm for threading the needles, said needles being arranged in a plane cutting the longitudinal axis of the work support at an acute angle, and means coöperating with the needles for placing the loops of thread carried thereby in a predetermined position relative to their respective needles so as to insure the formation of stitches regardless of the direction of feed, a presser foot for holding the material on the work support, and means for automatically raising the presser foot when the needles are beneath the material to permit the feeding of said material.

62. The combination of a standard, a work supporting arm projecting therefrom, a work support carried thereby, an overhanging arm projecting from the standard, a plurality of hook needles mounted beneath the work support and passing up through the work support to enter the material, thread-carrying devices mounted on the overhanging arm for threading the needles, said needles being arranged in a plane cutting the longitudinal axis of the work support at an acute angle, means coöperating with the needles for placing the loops of thread carried thereby in a predetermined position relative to their respective needles so as to insure the formation of stitches regardless of the direction of feed, a presser foot for holding the material on the work support, means for automatically raising the presser foot when the needles are beneath the material to permit the feeding of said material, and means for positively preventing the presser foot from being raised by the needles as they enter the material.

63. The combination of a work support, a presser foot, a presser bar carrying said presser foot, a guide bar connected to said presser bar, a hook needle mounted beneath the work support and passing up through the same to enter the material, a thread-carrying device for laying a thread in said needle, a bar supporting said thread-carrying device, a universal joint connection for supporting said bar for the thread-carrying device on said guide bar, a shaft, means for moving the shaft endwise and for oscillating said shaft, said shaft having an arm projecting therefrom, and a ball joint through which said bar carrying the thread-carrying device slides between its ends.

64. The combination of a work support, a presser foot, a hook needle mounted beneath the work support and extending through the same to enter the material, means for laying a thread in the hook of the needle, a thread finger engaging the thread between the thread-carrying device and the material, a presser bar carrying said presser foot, a guide bar attached to said presser bar, a bar supporting said thread-laying finger, a universal joint connection for supporting said bar carrying the thread finger at the upper end of said guide bar, a shaft, means for moving the shaft endwise and for oscillating the same, an arm projecting from the shaft, said arm having a ball joint sliding connection with the bar supporting the thread finger between the ends thereof.

65. The combination of a work support, a presser foot, a hook needle, means for threading said hook needle, a loop positioning device for engaging the needle loop on the hook needle and placing said loop in a predetermined position relative to the needle, a support for said loop positioning device, a lever on which said support is mounted, means for oscillating said support, and means for oscillating the lever in a direction at right angles to the plane of oscillation of the support on the lever whereby said loop engaging device is moved across the path of the needle into engagement with the loop of thread thereon, and then in a direction at an angle to its first path of movement to release said loop.

In testimony whereof, we affix our signatures, in the presence of two witnesses.

JAMES R. MOFFATT.
RALPH S. KELSO.

Witnesses:
A. F. KREDSHALL,
J. C. RATNER.